(12) United States Patent
Andersen

(10) Patent No.: US 9,535,603 B2
(45) Date of Patent: Jan. 3, 2017

(54) COLUMNAR FITTED VIRTUAL KEYBOARD

(71) Applicant: Carl F. Andersen, Arlington, VA (US)

(72) Inventor: Carl F. Andersen, Arlington, VA (US)

( * ) Notice: Subject to any disclaimer, the term of this patent is extended or adjusted under 35 U.S.C. 154(b) by 478 days.

(21) Appl. No.: 13/826,909

(22) Filed: Mar. 14, 2013

(65) Prior Publication Data
US 2014/0267044 A1 Sep. 18, 2014

(51) Int. Cl.
*G06F 3/02* (2006.01)
*G09G 5/00* (2006.01)
*G06F 3/0488* (2013.01)

(52) U.S. Cl.
CPC ............................... *G06F 3/04886* (2013.01)

(58) Field of Classification Search
CPC .................... G06F 3/04883; G06F 3/04886
See application file for complete search history.

(56) References Cited

U.S. PATENT DOCUMENTS

| | | | |
|---|---|---|---|
| 8,957,868 B2 | 2/2015 | Zhu et al. | |
| 2005/0122313 A1* | 6/2005 | Ashby | .................. G06F 3/0219 345/168 |
| 2010/0040400 A1 | 2/2010 | Hirsch | |
| 2010/0259561 A1 | 10/2010 | Forutanpour et al. | |
| 2011/0035696 A1 | 2/2011 | Elazari et al. | |
| 2011/0078567 A1 | 3/2011 | Kim et al. | |
| 2012/0019562 A1 | 1/2012 | Park et al. | |
| 2012/0075194 A1 | 3/2012 | Ferren | |
| 2012/0133589 A1 | 5/2012 | Marsden et al. | |
| 2012/0144337 A1 | 6/2012 | Archer et al. | |
| 2012/0166995 A1 | 6/2012 | McAleer | |
| 2012/0200503 A1 | 8/2012 | Berenger | |
| 2012/0326996 A1* | 12/2012 | Cho | ...................... G06F 3/0237 345/173 |
| 2013/0002562 A1 | 1/2013 | Leskela et al. | |
| 2014/0168083 A1* | 6/2014 | Ellard | ................. G06F 3/04886 345/168 |

FOREIGN PATENT DOCUMENTS

| | | |
|---|---|---|
| CN | 102541420 A | 7/2012 |
| DE | 103 30 002 A1 | 1/2005 |
| TW | 201237727 A1 | 9/2012 |

OTHER PUBLICATIONS

Virtual Keyboards on iPhone and Android, Aug. 7, 2009, file:///C:Users/jasvinder/Desktop/ignore the code Virtual Keyboards on iPhoneand Android.htm, pp. 1-9.

(Continued)

*Primary Examiner* — Andrew Sasinowski
*Assistant Examiner* — Brent D Castiaux
(74) *Attorney, Agent, or Firm* — David S. Safran

(57) ABSTRACT

A method and system of inputting text having a virtual keyboard on a touch sensitive input panel or display screen. The virtual keyboard includes a set of key elements such that each letter of the alphabet may be input by at least one key element. The present method arranges and sizes the virtual keys in a columnar layout organized around the size, shape, and angle of the user's fingers. The columnar layout overlays a background containing additional keys. The user can interactively adjust the layout to adapt to changes in hand properties. For smaller screens having space restrictions, the layout may be strategically masked to efficiently use available space while still preserving various benefits of the system.

14 Claims, 19 Drawing Sheets

(56) References Cited

OTHER PUBLICATIONS

Finger Friendly Keypad, p. 3, maemo.org, Jun. 19, 2010, 8 Pages.
Typeway Adaptive Keyboard for iPad Review, Appletell, Charles Moore on Feb. 5, 2012 at 5:22 pm, 9 Pages.
Hanson—One Handed Keyboard, Aug. 29, 2012, 10 Pages.
International Preliminary Report on Patentability for Application No. PCT/US2014/018184 dated Sep. 24, 2015.

* cited by examiner

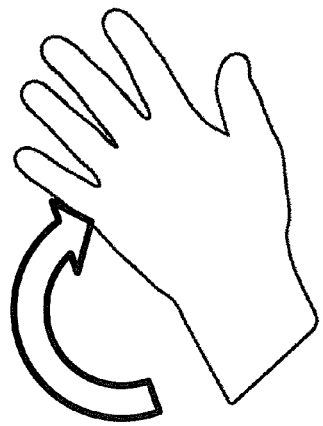
FIG. 12
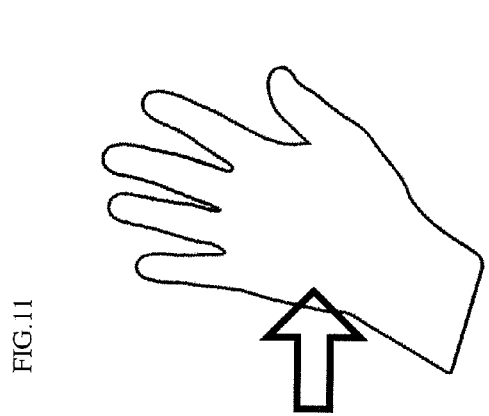
FIG. 14
FIG. 11
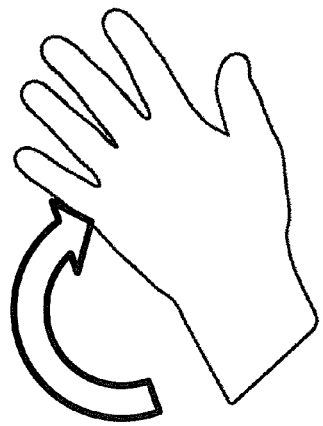
FIG. 13

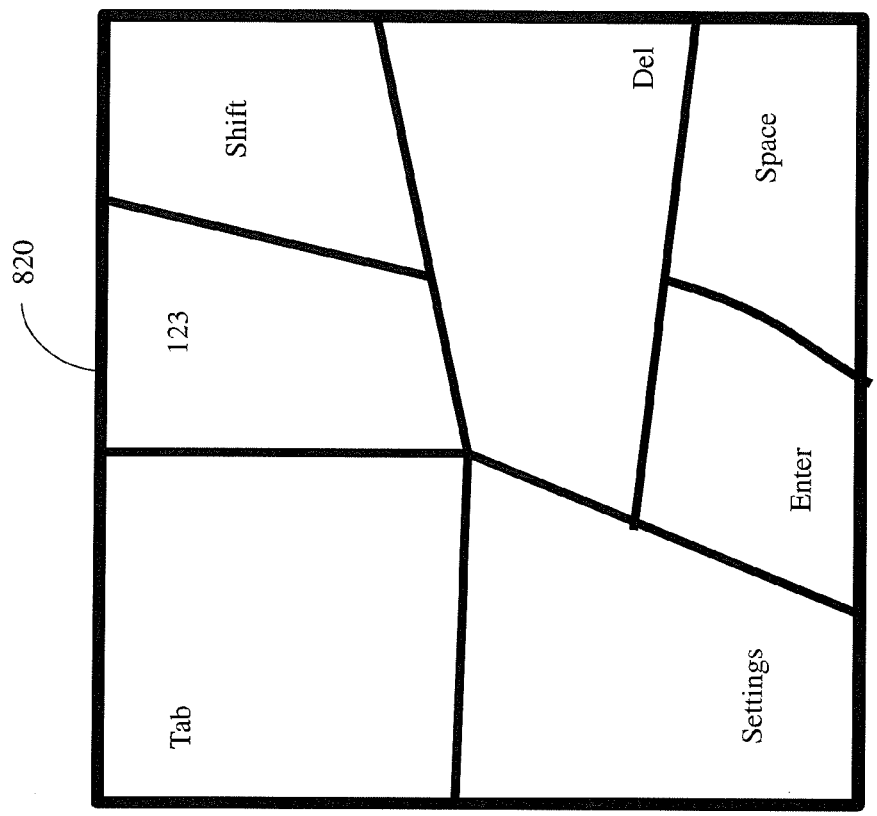
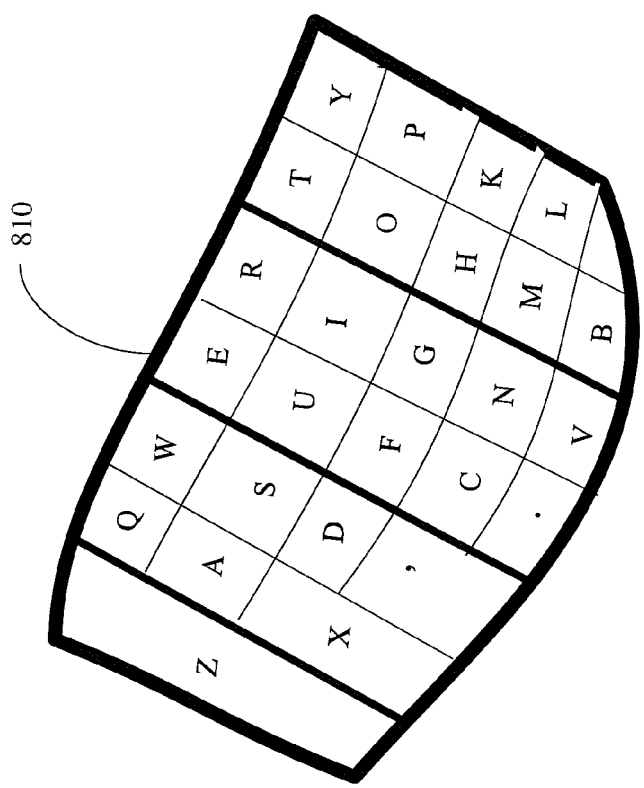
FIG. 17

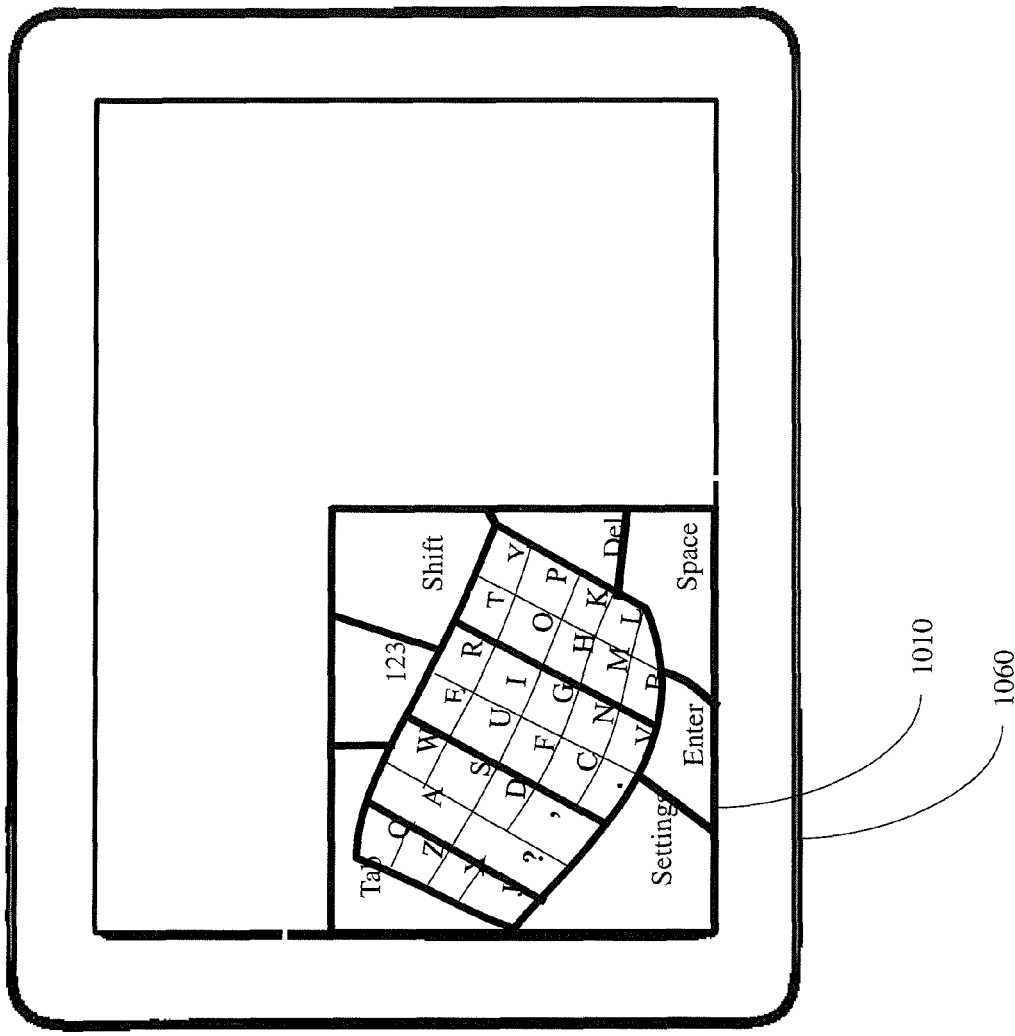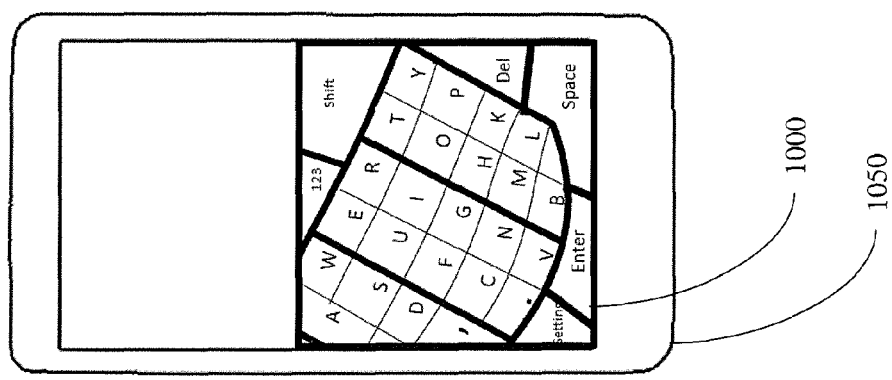
FIG. 22

COLUMNAR FITTED VIRTUAL KEYBOARD

BACKGROUND OF THE INVENTION

Field of the Invention

The present invention generally relates to virtual keyboards, and more particularly, to a virtual keyboard text entry system for devices with touch sensitive input panels or touch sensitive display screens.

Description of Related Art

The Standard Mechanical Keyboard, an example of which is depicted in FIG. 1, uses mechanical switches that are tapped to produce electronic outputs corresponding to individual characters. This keyboard system continues to be popular, and one of the fastest, tools for textual input into a device. However, the recent commercial popularity of handheld computing devices with touch sensitive technology has prompted the adaptation of the Standard Mechanical Keyboard, into a Standard Virtual Keyboard that retains many properties of its predecessor.

More specifically, a Standard Virtual Keyboard, examples of which are shown in FIG. 2, is a system and method used for entering text character-by-character using a keyboard displayed or printed on a touch-sensitive input panel or display screen, where contact by a user finger or fingers with the surface of the display generates input signals to the system corresponding to the location of contact. The Standard Virtual Keyboard divides a reserved entry area into discrete individual regions, or keys, that are struck individually, in a tapping motion called a keystroke, in order to output a particular character associated with that key. Standard Virtual Keyboards typically preserve many properties of Standard Mechanical Keyboards, including their overall rectangular shape, the organization of rectangular-shaped keys in a grid, and significant fragments of the original key layout. While numerous variants of this system exist, the most popular of these systems all use the basic features described above, justifying the depiction of the Standard Virtual Keyboard as "standard".

For example, a standard layout for a Standard Mechanical Keyboard refers to (1) the geometric properties of the Standard Mechanical Keyboard's keys, including the size of each key and the division of the keyboard into rows having a certain number of keys. The standard layout also encompasses (2) the assignments of characters to the various keys (i.e., the QWERTY system), including the positional relationships between these characters (e.g., a "k" is directly to the left of an "l"). Variations of the standard layout are conventionally described in terms of being "similar to" a standard layout with respect to these properties.

In various countries, different character sets (see, e.g., www.unicode.org) are used, and therefore standard mappings of characters to keys on the Standard Mechanical Keyboard have been devised for those character sets. Therefore, standard layouts exist for Dutch, Japanese, Italian, etc. However, if some new layout L (composed of both key geometry and character assignments) is similar to the standard layout for English (i.e., the QWERTY layout), then it may be straightforward to adapt L for some new character set C so that the same similarities exist with the corresponding standard layout for C. This is because all of these standard layouts use the same underlying keyboard and key geometry, differing only in which characters are mapped to the keys. Therefore, L could be adapted for C simply by a process of character remapping.

A standard layout for a given character set is significant for three reasons. First, users of that character set have already taken significant time and effort to learn to type using that standard layout. Therefore, to the degree that a novel keyboard uses a layout that is similar to the standard layout, it will be easier for these users to learn the new layout.

Second, users of a standard layout have obtained some degree of "muscle memory" of that layout, where muscle memory is the ability of the human neuromuscular system to "remember" the locations of individual keys and quickly perform the micro-movements needed to position the hand near the key and then to strike the key with a finger. Muscle memory allows tasks to be performed more quickly and accurately, so its acquisition is a significant benefit. Therefore, to the degree that a novel keyboard layout is similar to a standard layout, muscle memory of the standard layout can be accessed and used when typing with the novel keyboard, leading to speed and accuracy benefits.

Finally, familiarity and muscle memory help greatly reduce the cognitive effort required to type successfully. Therefore, to the degree that a novel keyboard layout is similar to a standard layout, the novel keyboard will require less cognitive effort of users. All the above advantages of similarity to a standard layout can increase user acceptance of a novel layout.

The transition of the Standard Mechanical Keyboard to virtually has exposed limitations of the system, which was in use long before computers and touch screens were conceived of. For example, for effective use, a Standard Mechanical Keyboard: (1) should be at least a certain size; (2) should be used in a somewhat constrained user posture and spatial attitude to the keyboard; and (3) should be typed upon with two hands. However, handheld touch-screen computing devices, the conventional field of use for the Standard Virtual Keyboard, typically place stress on the above constraints, as they are usually small, are used in a variety of postures and attitudes, and are often typed upon using only one hand. More specifically, the geometry and use patterns of these new devices significantly stress and degrade the original design goals of the standard mechanical keyboard, even after significant adaptation for the virtual environment.

There are at least two commercially dominant classes of handheld touch-screen computers in use today, two of which are shown in FIG. 2: smartphones 10 and tablets 20. Both of these device types are significantly narrower than a Standard Mechanical Keyboard: popular exemplars of these devices are 9.5" wide for a tablet, 2.5" wide for a smartphone, and 12" wide for a mechanical laptop keyboard. In order to adapt to these smaller widths, the Standard Virtual Keyboard eliminates many keys and their associated characters from the primary input screen, including the row of function keys (e.g., F1) and the navigation keys (e.g., arrow keys, Home, etc.). The primary input screen, shown on both the devices in FIG. 2, contains the alphabetic keys and keys for a small number of other characters that are very frequently typed, such as the Space key. In total, these screens contain only about 35 keys, while a Standard Mechanical Keyboard typically contains over 80 keys. Other characters and their keys (e.g., numerical keys) are removed to a secondary input screen (not shown) that is similar to the primary input screen in organization, but outputs different characters. This secondary input screen is typically invoked using a dedicated key 30, 40. Additional keys located on the primary or secondary input screens can be used to invoke additional input screens. Combined, all the input screens can be used to type all the keys typically found in the Standard Mechanical Keyboard.

The Standard Virtual Keyboard is a partial success, in that two-handed typing can be performed on at least the larger tablets. However, the postural requirements for successful two-handed typing are somewhat difficult. A user typically either balances a tablet on their lap, which is often precarious and uncomfortable, or sits at a table supporting the tablet, which introduces ergonomic problems experienced even by users of mechanical keyboards, but potentially more serious for virtual keyboard users because of table height variations. Additionally, because one of the attractions of tablets is their quick, convenient use in real-world postures (e.g., curled up on the sofa), many users prefer not to adopt the constrained postures described above.

Subtle differences from the Standard Mechanical Keyboard typing experience also make the Standard Virtual Keyboard experience less satisfactory. For example, the virtual keyboard and the display share the device surface. The keyboard therefore uses a large part of the overall device surface, reducing available display space. The sharing of the device surface between keyboard and display also degrades typing efficiency. Typically, to better see the display, a user prefers to tilt the device to some angle between horizontal and vertical. However, this tilt interferes with effective typing on a standard keyboard, which requires the key surface to be horizontal so that the hands can quickly and easily move over the keyboard at a set distance above it.

Even disregarding the above issues, the narrowness of a tablet requires a two-handed typist to maintain both hands in the palms-down typing position, but closer together than is the case with mechanical keyboards. This posture may be tiring to maintain over time, and may degrade typing speed. A final difficulty is that because a touch surface registers all finger touches as potential key strokes, between key strokes a user must maintain both hands at a small height above the surface, in contrast to mechanical typing, where the fingers may rest lightly on the keyboard. This floating position can be fatiguing for the user over time.

Another difficulty with the standard virtual keyboard concerns the use of multiple keyboard input screens to type the full set of characters used by the keyboard. The main disadvantage of this multi-screen solution is that typing speed suffers. For example, when a secondary input screen is invoked, the entire touch surface must be redrawn. The redrawing process is computationally costly and often imposes a slight delay that is perceptible to the user. This redrawing process must be repeated when the user returns to the primary input screen. Another reason typing speed suffers is the relatively complex sequence of keystrokes required to type a key residing on a secondary input screen. For example, to type the colon character, ":", on the keyboard in FIG. 2, a user must, in sequence, (1) tap the '123' key on the primary input screen in order to invoke the secondary input screen; (2) tap the colon key on the secondary input screen; and, in preparation for further typing on the primary input screen, (3) tap the '123' key on the secondary input screen in order to return to the primary input screen. Therefore, typing a colon typically requires a sequence of three keystrokes, which typically takes three times as long to type and also increases the chance of a typing error. A final disadvantage of using multiple input screens is that rapidly switching between multiple screens can be disorienting to the user, especially if the key layouts substantially differ between the screens.

For many of the above reasons, but particularly to avoid the inconvenience and discomfort of adopting a restrictive two-handed posture, many users prefer to type one-handed on tablets. However, one-handed typing on any tablet's Standard Virtual Keyboard can be extremely inefficient. One might expect one-handed typing in this context to be about half as fast as two-handed typing, but it may actually be even slower. This is because typically a Standard Keyboard (either Virtual or Mechanical) is designed for two-handed typing, and therefore places all keys within a short distance of one of the expected ten fingers. Therefore, a one-handed typist often has to move their hand half the width of the keyboard to reach a letter, dramatically reducing the typing rate.

Furthermore, a one-handed typist can use only the muscle memories of one hand, which concern keys on only (roughly) half the keyboard. Therefore, striking keys on the other half of the keyboard may especially be slow. Even the remaining muscle memory is significantly disrupted, because the one typing hand is continually moving long distances from side to side. For many users, one-handed typing devolves to one-fingered typing, in a "hunt and peck" experience in which each key is painstakingly searched for.

Typing using standard virtual keyboards on smartphones is, if anything, even less efficient and convenient because of their extremely small size. Conventional two-handed typing, in which the hands hover over the keyboard, is near impossible when the phone is placed in a portrait orientation because the screen is typically too narrow to admit the use of both hands. Conventional two-handed typing is barely possible on a smartphone placed in landscape orientation, but the user must adopt an especially uncomfortable posture and the hands obscure the typing surface. The typing surface itself consumes most of the device area, leaving almost no space for the display. In addition, the individual keys are very small, requiring dramatically more accuracy to successfully strike the desired key. This need for extreme accuracy disrupts a fundamental speed advantage of standard keyboards: multi-finger typing, or, the ability of all five fingers to strike keys in quick succession, or even simultaneously. The multi-finger typing style, in which muscle memory plays a large role, is much less workable on a smartphone, because the user makes so many more mistakes at full speed when the keys are so small. For all these reasons, conventional two-handed typing on smartphones is infeasible.

In response, many users have adopted a new form of typing using smartphone keyboards comprising a two-thumb typing method, shown in FIG. 3, in which the phone is held up in both hands and both thumbs are used to press keys. Two-thumb typing achieves a fair degree of speed and accuracy since the two thumbs are more dexterous than the fingers and strike in quick succession, but the method has two disadvantages. First, the phone must be held up with both hands, which eventually becomes tiring, and makes the hands unavailable for other tasks. Second, two-thumb typing is not really feasible on tablets, both because the keyboard, which spans the width of the device, is too large for the thumbs to reach all keys, and because tablets may be too heavy to hold up for extended periods. Therefore, this typing method is not generalizable. In other words, a user who invests the time in developing two-thumb muscle memory on a smartphone must find some other method of typing for a tablet.

Another typing method for use with smartphone standard virtual keyboards is to type one-handed. This method performs better on smartphones than on tablets, because the hand needs to move a shorter distance to position a finger to strike any key. However, one-handed, multi-finger typing on a smartphone is still too error-prone to be practical, because the keys are too small. Instead, users employ one-fingered typing, as shown in FIG. 4, or one-thumb typing, so that they need only concentrate on one finger striking the correct keys. Using only one digit to strike keys obviously drastically limits the attainable speed, and typing accuracy is challenged even with one finger or thumb because of the small key size. To support one-digit typing, the hand often moves almost two inches laterally, making it difficult to develop effective muscle memory, which relies on smaller-scale movements. Fundamentally, striking a succession of small rectangles, each an inch or more away from the last, is a difficult task requiring a great deal of practice and concentration to master. A final important disadvantage is that, one-fingered typing, like two-thumb typing, is not generalizable, because the size differential between smartphone and tablet keyboards is so great as to make the one-fingered typing experience on these devices very different. Therefore, a user mastering one-fingered typing on a smartphone cannot transfer this mastery to tablet use, and vice versa.

A plethora of virtual keyboard systems have been developed to correct the speed and usability shortcomings of the Standard Virtual Keyboard. These systems may be categorized by initially enumerating a set of properties that any virtual keyboard used for tablet and/or smartphone typing should have to be successful, then the various keyboard systems may be categorized according to which properties each possesses.

In the inventor's opinion, the following properties should be implemented to make a successful virtual keyboard system.

A first property (1) of a successful virtual keyboard system is that they should support multi-finger typing with only one hand. While the foregoing provides reasons for this requirement, the most compelling are that: (a) on a tablet, two-handed typing in relaxed postures is difficult; and (b) on a smartphone, two-handed typing in any posture is very difficult. Since one-handed typing is most favorable, a successful system should organize its keys to support such a typing style, primarily by including most or all of the most frequently typed characters from the Standard Layout within easy reach of one hand. Some methods of accomplishing this might include making the keys smaller, and/or changing their relative positions, and/or changing the shapes of the keys.

A second property (2) of a successful virtual keyboard system is that they should somehow maintain the typing speeds associated with the Standard Mechanical Keyboard, despite the changes to the layout made in order to achieve multi-finger typing with only one hand. The most likely way this might be achieved is by organizing the keys in some fashion around the fingers, so that smaller and more uniform movements would be sufficient for fingers to reach and strike the keys. Such an organization may boost speed, because smaller movements are made more quickly than large movements. Additionally, a system consisting largely of smaller movements may be easier to type, because it may be difficult for fingers to alternate between making small and large movements. This could boost typing accuracy, which may in turn further boost speed, because the user may need to waste less time correcting mistakes.

In the inventor's opinion, the following beneficial ways for organizing keys around the fingers could be implemented to make a successful virtual keyboard system. Specific beneficial ways that the keys could be organized around the fingers may include the following. First (a), the field of keys typed by one hand could be arranged so that each key's angle matches the angle made by the hand to the touch surface edge: this angle is often approximately 30-45 degrees. Second (b), the field of keys typed by one hand could be arranged so that it more closely matches the overall shape of the hand. Third (c), the principle of (b) might be extended by dividing the keys into groups so that each group is placed near an individual finger which is responsible for typing that group. Organizing keys in this fashion allows each key to be struck using finger movement alone, without moving the arm, promoting typing accuracy. Fourth (d), the principle of (c) might be extended by arranging the group of keys associated with one finger in a columnar fashion, so that the keys are placed under the area occupied by a finger, in the area that is easily reached by the finger in its natural range of motion. This arrangement may offer the greatest scope for minimizing and regularizing the movements required to type any arbitrary key. Ideally, such an arrangement could place keys in an area roughly matching the width of individual user fingers so that the side-to-side distance required to reach keys may be minimized.

A third property (3) of a successful virtual keyboard system is that they should be at least partially similar to the Standard Layout, so that they would be easier for the typical user to learn.

A fourth property (4) of a successful virtual keyboard system is that they should comprise an interactive process that allows the layout to be fit to the user's hand. Supporting this kind of close, customized fit should further reduce the distances required to type individual keys, further boosting typing accuracy and speed.

Many virtual keyboard systems explore property (2a) by splitting the Standard Keyboard into left and right halves and then changing the angle of each half to better match that of its associated hand. This is type of virtual keyboard system is described in U.S. Patent Application Publication No. 2012/0144337, which also implements a form of (2b) by adjusting the width of individual keys to match a user's hand width, in an interactive process.

U.S. Patent Application Publication No. 2010/0259561, also splits and angles the keyboard, and also implements a form of (2b), using a learning process that repeatedly adjusts individual key centroids to move closer to the points user fingers actually touch when striking the keys. In this way, the key positions could potentially evolve to some configuration presumably closer to the fingers' preferred position.

U.S. Patent Application Publication No. 1997/5660488 also splits and angles the keyboard. However, it is different from the prior systems because it spreads out the angled key halves to fill the entire available entry area.

German Patent Application No. DE 10330002 A1 does not split the keyboard, but an interactive process allows portions of the keyboard to be independently shaped and angled ("morphed") according to user touches.

All of the above systems are intended for two-handed use, and thus do not possess property (1). All of the above systems also angle the keys to match user hands (property (2a)); some adjust key placement to better fit user fingers (properties (2c) and (4)). However, none explicitly organizes the keys in groups assigned to fingers (property 2c), so it is likely that the distances required to strike individual keys would remain somewhat large and also irregular. All the above keyboards except for DE 10330002 A1, which uses a different character layout, are quite similar in layout to the Standard Layout (property (3)).

Several keyboards arrange the keys in an arc centered around the hand. One of these is U.S. Patent Application Publication No. 2012/0075194, which supports one-thumb typing. The keys are arranged in tiered arcs around the thumb (located in the lower corner) so that each key can be reached by the thumb's normal range of motion. Obviously, this system does not support multi-finger typing, and thus may be quite slow. Furthermore, the distance required to type any one key would be considerable, which may degrade accuracy and speed.

Another system using arcs is the HansOn Keyboard (e.g., see magnamus.tumblr.com), a one-handed keyboard that arranges the keys in concentric arcs around the hand. Both the position and the angle of the arcs can be adjusted interactively. The arc design reduces the distance required for one hand to type an arbitrary key from that required on a tablet-size Standard Virtual Keyboard. However, this distance is still sizable, because the keys are not organized around individual fingers. The distances and directions needed to type individual keys are also quite varied and irregular.

European Patent Application No. EP 2474890 A1 organizes keys around the fingertips of a user's hand: keys are assigned to some finger and then placed in a circular area around the point at which the fingertip touches the touch surface. This scheme, which possesses the property (2c), may minimize the distance a finger must travel to type a key. However, this scheme may be presented only abstractly. In other words, the application offers no plan for how keys from the Standard layout would be specifically allocated and organized. For a number of reasons, this scheme may be impractical. Even if only the 35-odd keys from the Standard Virtual Keyboard were allocated to the five fingers, this would mean seven keys per finger would be placed in a very small area around that finger. These small key sizes would most likely lead to inaccurate typing in practice. The movements required to type the keys may also be irregular, which might lead to further inaccuracy. While the system includes a method of fitting the keyboard to a user's hand (property 4), it possesses almost no structural similarity to the Standard Layout (property 3), and thus may be difficult to learn. This keyboard system may use space inefficiently, making it an unlikely fit for a space-constrained device like a smartphone.

U.S. Patent Application Publication No. 2005/0122313 organizes keys in reference to a Home Row of key positions obtained from the points at which the user's hand touches the touch surface. In an interactive process, the system maps certain keys from the Standard Layout directly to the Home Row positions, and then tries to map the remaining keys to positions which preserve similarity to the Standard Layout but also reflect the chosen Home Row positions. This keyboard therefore may possess property (2c), as well as properties (3) and (4). However, because this system only imposes a loose organization of keys that can leave them quite far away from fingers, any improvements in typing speed are likely to be limited.

Two existing keyboard systems organize keys into a columnar layout that provides a method of minimizing finger typing distances and promoting regular movements. These systems both possess property (2d). However, neither system places each column directly under one specific finger, limiting the accuracy that can be achieved. Plus, neither is designed for one-handed typing (property 1).

The first system, U.S. Design Pat. No. D639,807, shows a design for a mechanical, not a virtual, keyboard, and the keyboard is two-handed, not one-handed. This system organizes keys into vertical columns, some of which appear to be typed by one finger (property 2d). Each column appears to be sized and angled in an effort to match the expected size and angle of its associated finger. However, in addition to being inapplicable to a virtual, one-handed typing environment, the system has a drawback. Multiple key columns are assigned to one finger, such that no column is located exactly under the region occupied by that finger. Therefore, typing keys in the columns requires significant lateral movement, somewhat defeating the original purpose of columnar organization.

U.S. Pat. No. 5,336,001A is another keyboard system emphasizing a columnar layout; it is a virtual keyboard, although not one-handed. This system shares the shortcomings of the prior system in that its key columns are not located entirely under the region occupied by one finger, such that fingers must traverse greater distances to type keys in columns. Additionally, since the system is for two-handed typing, it is not a successful solution for tablet and/or smartphone typing. To be useful for one-handed typing, the key columns typed by one hand would somehow need to contain all the most frequently typed characters from the Standard Layout. Since there are many such characters, fitting them onto a set of key columns typed by only one hand may not be an easy problem to solve.

Consequently, while many methods of typing on a Standard Virtual Keyboard exist, most are awkward, inaccurate, and/or slow. Accordingly, there exists a need in the art to overcome the deficiencies and limitations described hereinabove.

SUMMARY OF THE INVENTION

In a first aspect of the invention, a virtual keyboard is provided for implementation on a computing device. The virtual keyboard includes a plurality of keys configured in an adjustable layout. Each key of the plurality of keys includes at least one alphabet character. The adjustable layout includes the plurality of keys configured at a same angle offset from perpendicular to a base of the computing device and sloped in a same direction.

In another aspect of the invention, a virtual keyboard is provided for implementation on a computing device. The virtual keyboard includes a plurality of keys configured in an adjustable layout. The adjustable layout includes the plurality of keys configured into a plurality of key columns including column borders that are straight lines and row borders that are straight or curved lines. The plurality of key columns are organized into one or more finger columns that include a predetermined number of keys configured to match certain fingers and finger widths.

In an additional aspect of the invention, a virtual keyboard is provided for implementation on a computing device. The virtual keyboard includes a first layer comprising a plurality of keys configured in an adjustable layout. The virtual keyboard also includes a second layer comprising a plurality of additional keys. Each key of the plurality of keys comprises at least one alphabet character and the first layer is configured to rotate over the second layer.

In a further aspect of the invention, a method is provided for construction of a virtual keyboard on a computing device. The method includes receiving a current handedness setting for a user. The method further includes constructing a vector pointing from a center of a touch sensitive surface to a side opposite that of the current handedness setting. The method further includes computing a sequence of finger line segments derived from touch points positions received for one or more fingers of a user's hand. The method further includes calculating a finger line angle for the one or more fingers of a user's hand based on the vector and the finger line segments. The method further includes computing a finger area for the one or more fingers of a user's hand based on the finger line segments, the finger line angles, the current handedness setting, and knowledge of typical hand geometry. The method further includes matching the finger area for each of the one or more fingers to a finger column that comprises a predetermined number of virtual keys for the virtual keyboard. The method further includes generating the virtual keyboard comprising each finger column matched with the finger area calculated for each on the one or more fingers of the user's hand.

In yet another aspect of the invention, a method is provided for character entry using a virtual keyboard on a computing device. The method includes receiving at least two data structures comprising a gesture pattern table and an event stream table. The method further includes determining whether a finger event has been received by the virtual keyboard. The method further includes determining a type of the finger event. The method further includes determining whether the whether the finger event continues an existing event stream in the event stream table. The method further includes when the finger event is determined to continue the existing event stream, append the existing event stream to include the finger event. The method further includes comparing the appended existing event stream with each defined gesture in the gesture pattern table. The method further includes when the appended existing event stream matches a defined gesture in the gesture pattern table, generating functionality relevant to the matched defined gesture on the virtual keyboard. The virtual keyboard comprises a plurality of keys configured in an adjustable layout, and the plurality of keys are configured to receive the finger event.

In yet another aspect of the invention, a system is provided including a computing device comprising a touch sensitive input panel or display. The system further comprises a virtual keyboard module implemented on hardware of the computing device, the virtual keyboard module configured to compute a finger area for the one or more fingers of a user's hand based on calculated finger line segments, finger line angles, and a current handedness setting, match the finger area for each of the one or more fingers to a finger column that comprises a predetermined number of virtual keys for the virtual keyboard, and generate the virtual keyboard on the touch sensitive input panel or the display such that each finger column is matched with the finger area calculated for each on the one or more fingers of the user's hand.

The present invention is described in the detailed description, which follows, with reference to the accompanying drawings by way of non-limiting examples of exemplary embodiments of the present invention.

BRIEF DESCRIPTION OF THE DRAWINGS

FIG. 11 shows an example of handedness in accordance with some aspects of the invention;

FIG. 12 shows an example of hand angle in accordance with some aspects of the invention;

FIG. 13 shows an example of hand translation in accordance with some aspects of the invention;

FIG. 14 shows an example hand size and shape in accordance with some aspects of the invention;

FIG. 17 shows an example of two layers in accordance with some aspects of the invention;

FIG. 22 shows a Layout for Dual Smartphone and Tablet Operation in accordance with some aspects of the invention.

DETAILED DESCRIPTION OF THE INVENTION

Introduction

Figure 1:
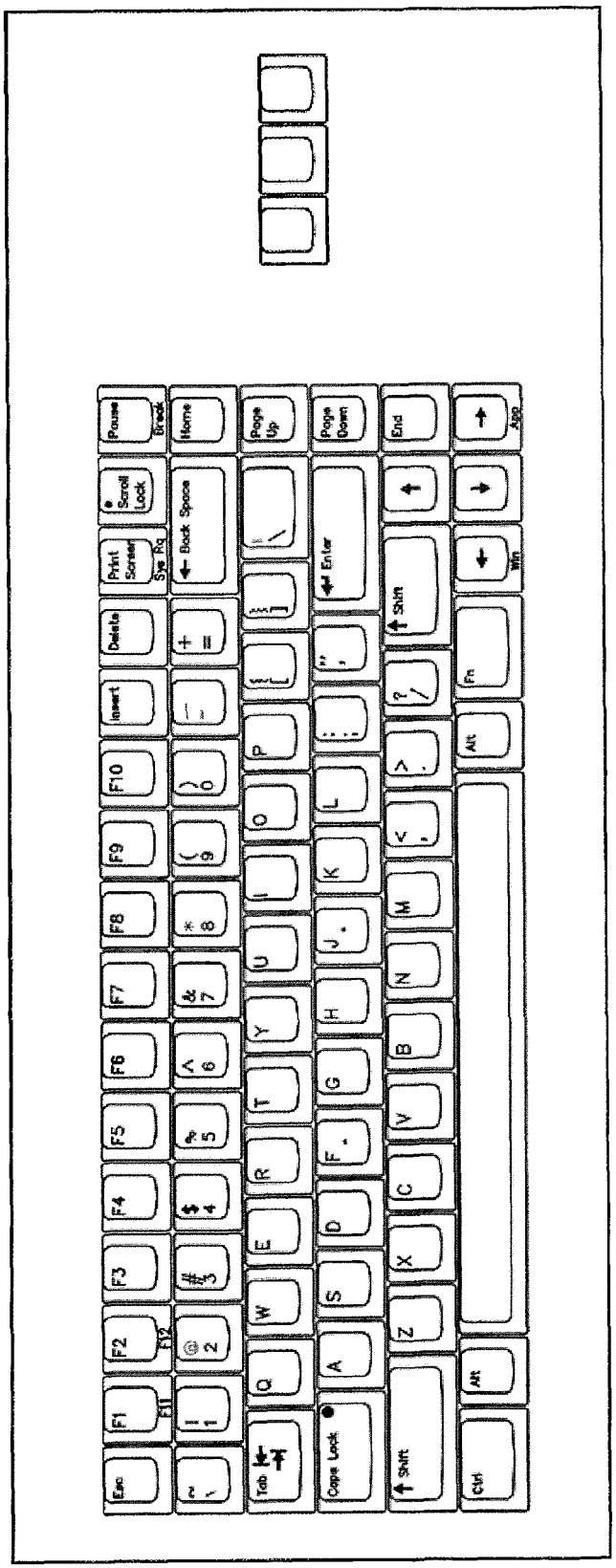
FIG. 1 shows an example of a Standard Mechanical Keyboard.
Figure 2:
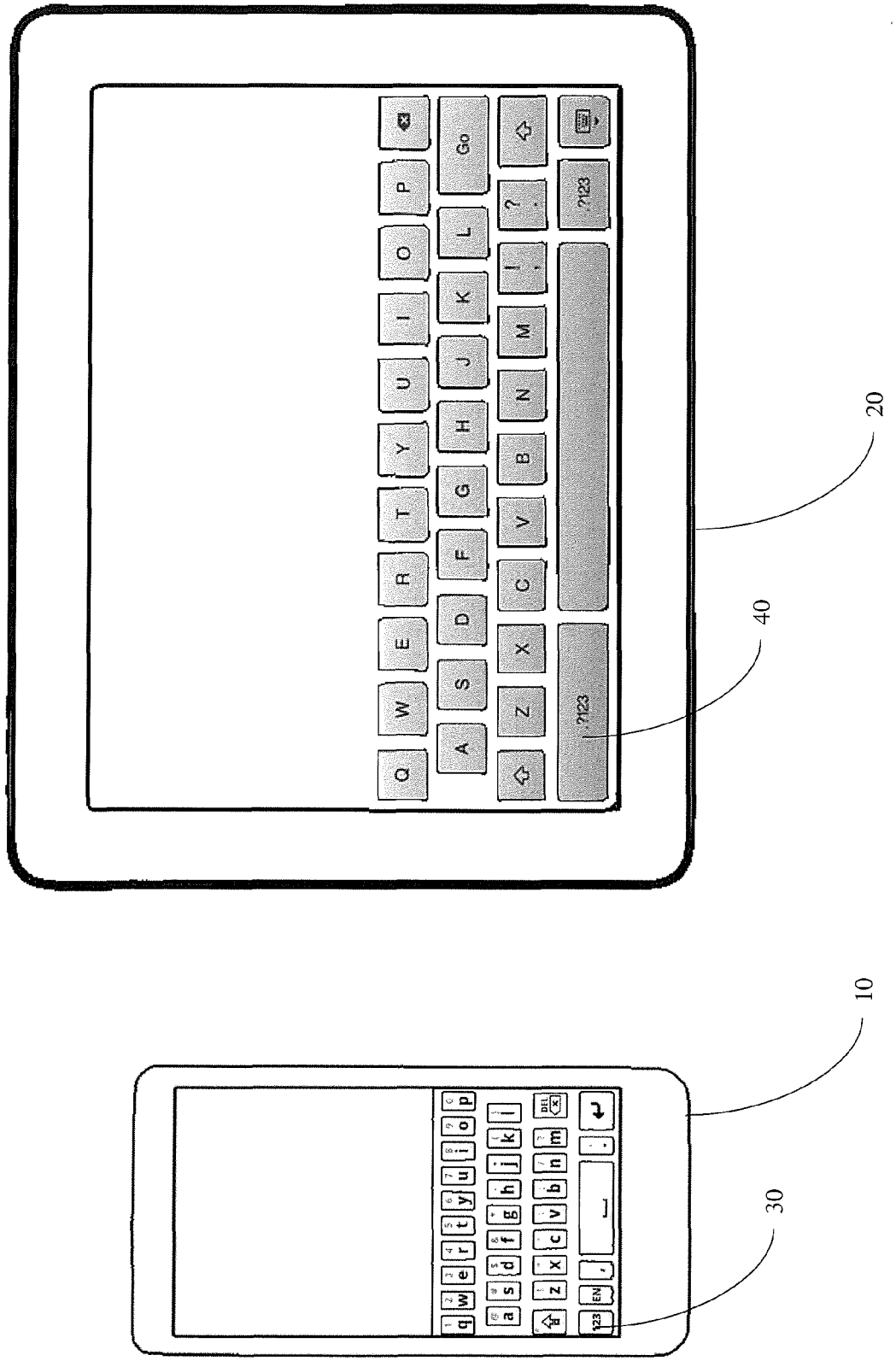
FIG. 2 shows examples of Standard Virtual Keyboards.
Figure 3:
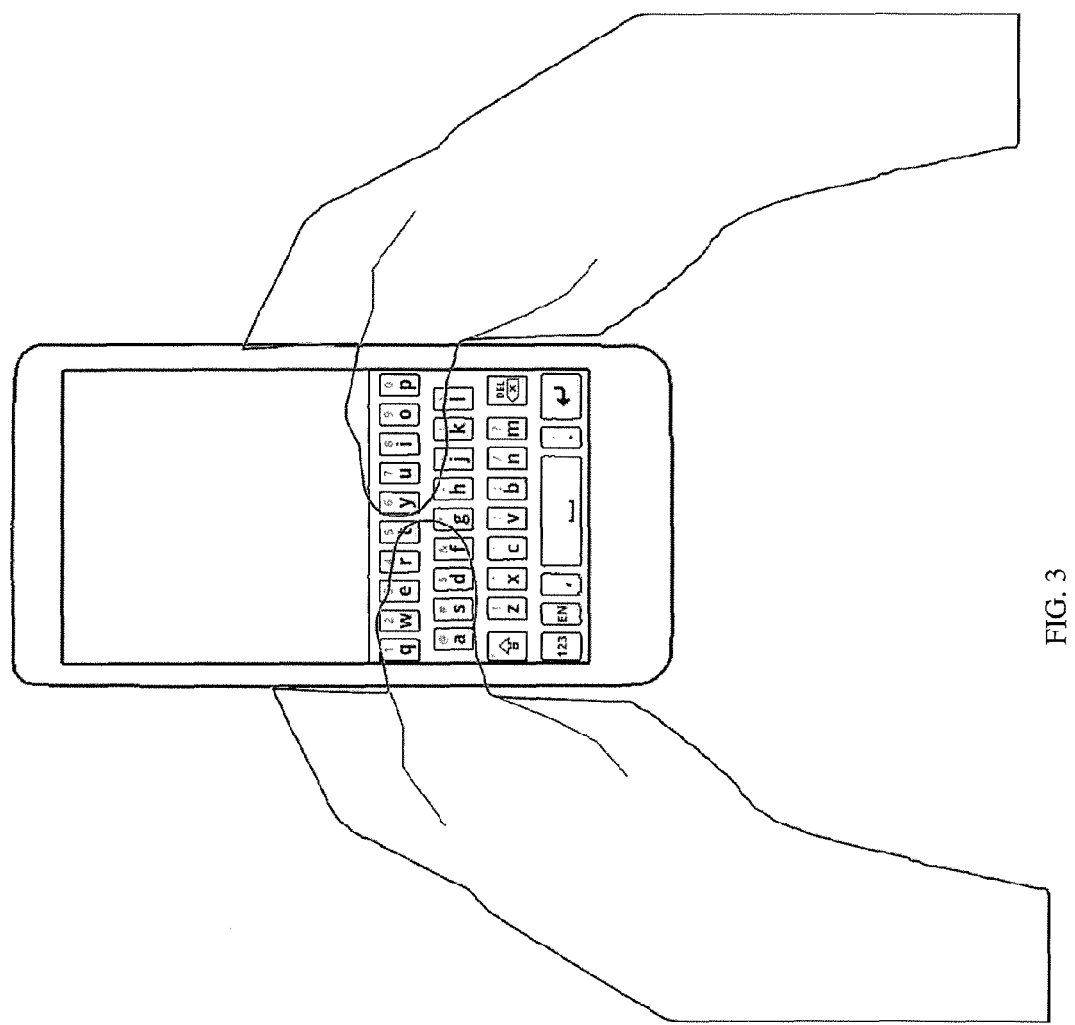
FIG. 3 shows an adapted form of typing comprising two-thumbs.
Figure 4:
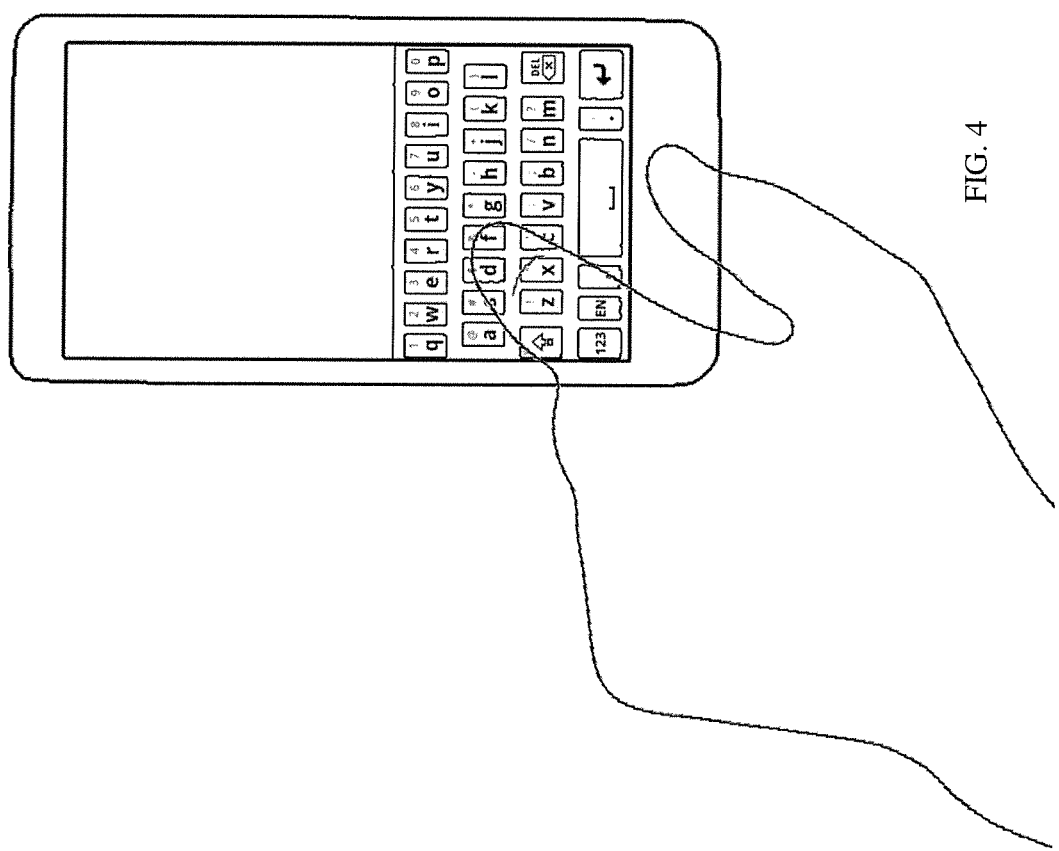
FIG. 4 shows an adapted form of typing comprising one-finger.

The present invention generally relates to virtual keyboards, and more particularly, to a virtual keyboard text entry system for devices with touch sensitive input panels or touch sensitive display screens. According to aspects of the invention, the system places keys in one or more columns located directly under fingers, e.g., all keys of either one column or one pair of columns for each finger are directly under the finger. In some embodiments, the columns are rotated, moved and sized so as to lie directly under the user's fingers using a fitting procedure. Advantageously, the system is configured to allow for fast typing by a user using multiple fingers of only one hand, even on devices having constrained input spaces, such as tablets or smartphones. Even more advantageously, the system is configured to make the typing experience on both these devices quite similar, such that a user mastering typing on smartphones can easily transfer this mastery to tablets, or vice versa.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
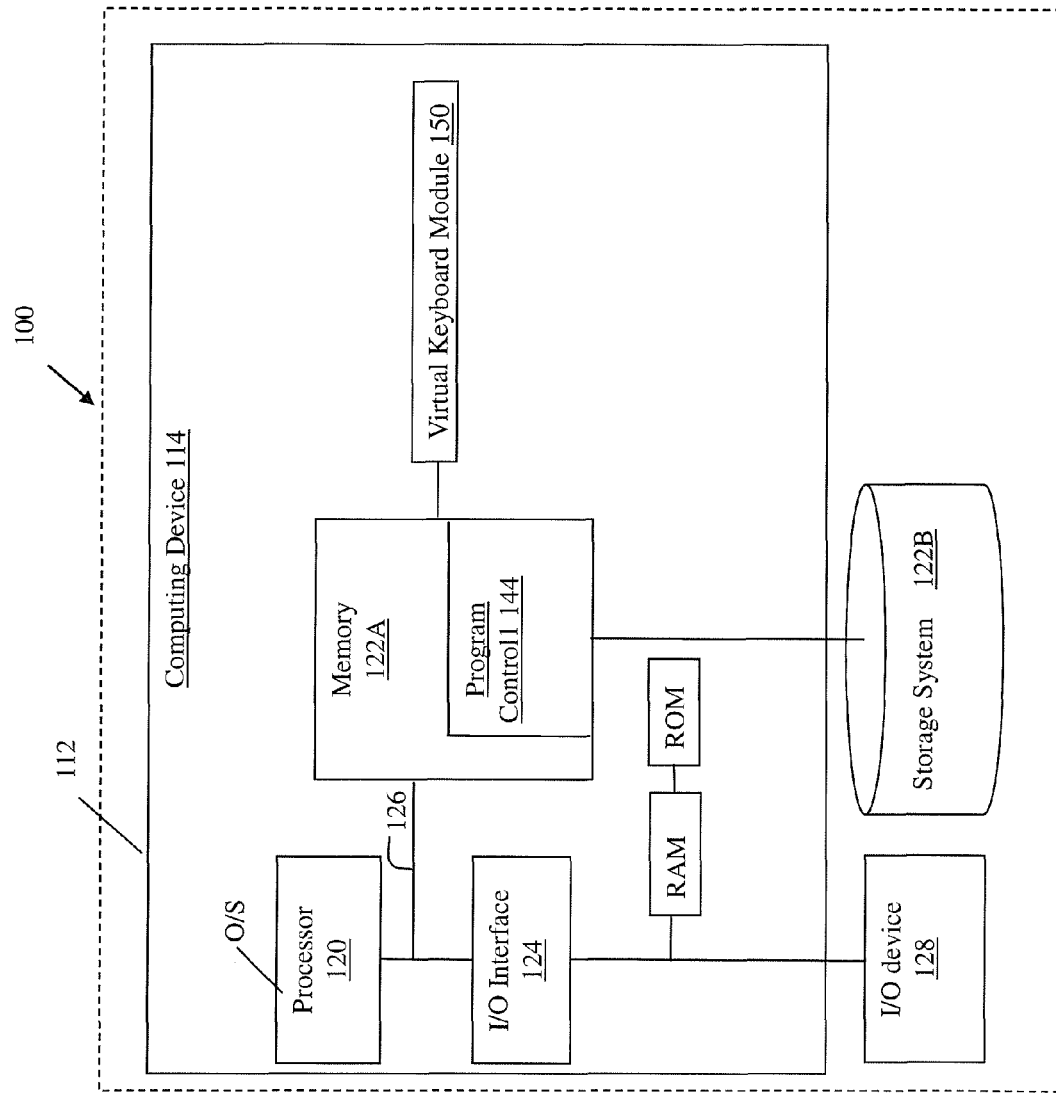
FIG. 5 is an illustrative external environment for implementing the invention in accordance with some aspects of the invention.

FIG. 5 shows an illustrative environment 100 for managing the processes in accordance with the invention. To this extent, the environment 100 includes a server or other computing system 112 that can perform the processes described herein. In particular, the server 112 includes a computing device 114 (e.g., a smartphone, a laptop, a tablet, etc.). The computing device 114 can be resident on a network infrastructure or computing device of a third party service provider (any of which is generally represented in FIG. 5).

The computing device 114 also includes a processor 120, memory 122A, an I/O interface 124 (e.g., a touch sensitive input panel or display), and a bus 126. The memory 122A can include local memory employed during actual execution of program code, bulk storage, and cache memories which provide temporary storage of at least some program code in order to reduce the number of times code must be retrieved from bulk storage during execution. In addition, the computing device 114 includes random access memory (RAM), a read-only memory (ROM), and an operating system (O/S).

The computing device 114 may be in communication with an external I/O device/resource 128 and the storage system 122B. For example, the I/O device 128 can comprise any device that enables an individual to interact with the computing device 114 or any device that enables the computing device 114 to communicate with one or more other computing devices using any type of communications link. The external I/O device/resource 128 may be for example, a handheld device, PDA, handset, mechanical keyboard, etc.

In general, the processor 120 executes computer program code (e.g., program control 144), which can be stored in the memory 122A and/or storage system 122B. Moreover, in accordance with aspects of the invention, the program control 144 controls a virtual keyboard module 150 to perform the processes described herein. The virtual keyboard module 150 can be implemented as one or more program code in the program control 144 stored in memory 122A as separate or combined modules. Additionally, the virtual keyboard module 150 may be implemented as separate dedicated processors or a single or several processors to provide the function of this module. In embodiments, the virtual keyboard module 150 may be configured to construct a virtual keyboard and/or process character entry as discussed in further detail herein. While executing the computer program code, the processor 120 can read and/or write data to/from memory 122A, storage system 122B, and/or I/O interface 124. The program code executes the processes of the invention. The bus 126 provides a communications link between each of the components in the computing device 114.

The computing device 114 can comprise any general purpose computing article of manufacture capable of executing computer program code installed thereon (e.g., a personal computer, a smartphone, a laptop, a tablet, etc.). However, it is understood that computing device 114 is only representative of various possible equivalent-computing devices that may perform the processes described herein. To this extent, in embodiments, the functionality provided by computing device 114 can be implemented by a computing article of manufacture that includes any combination of general and/or specific purpose hardware and/or computer program code. In each embodiment, the program code and hardware can be created using standard programming and engineering techniques, respectively.

Similarly, computing infrastructure 112 is only illustrative of various types of computer infrastructures for implementing the invention. For example, in embodiments, server 112 comprises two or more computing devices (e.g., a server cluster) that communicate over any type of communications link, such as a network, a shared memory, or the like, to perform the process described herein. Further, while performing the processes described herein, one or more computing devices on server 112 can communicate with one or more other computing devices external to server 112 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Key Columns

The present invention provides a system and method allowing the user to enter text character-by-character using a virtual keyboard displayed or printed on a touch-sensitive screen, wherein contact by a user finger or fingers with the surface of the display generates input signals to the system corresponding to the location of contact. In accordance with some aspects of the invention, the present invention organizes a reserved entry area within the touch-sensitive screen into discrete individual regions, or "keys", that are primarily (but not exclusively) struck individually, in a tapping motion, in order to output a particular character.

Figure 7:
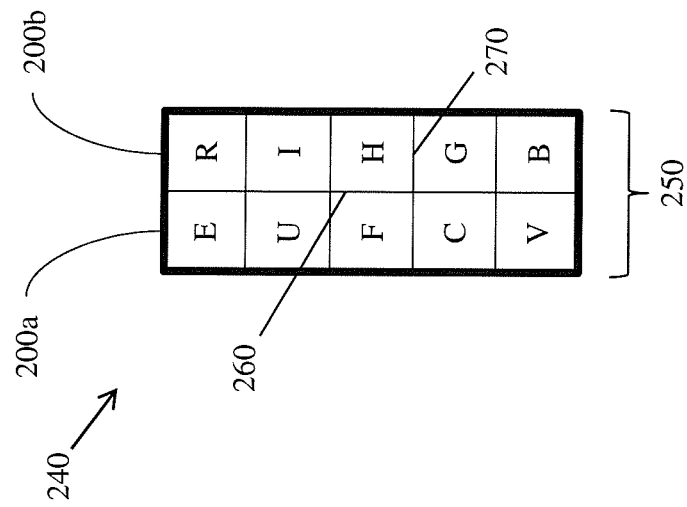
FIG. 7 shows an example of a finger column in accordance with some aspects of the invention.
Figure 6:
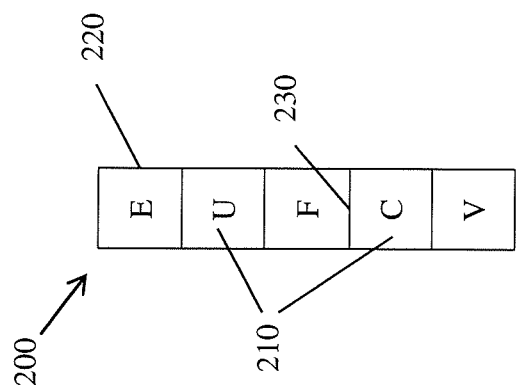
FIG. 6 shows an example of a key column in accordance with some aspects of the invention.

In some embodiments of the present invention, the keyboard keys of the virtual keyboard may be organized into multiple key columns within the reserved entry area. A shown in FIG. 6, each key column 200 may be a geometric column of keys 210, which comprises columnar borders 220 that may be straight lines and row borders 230 that may be straight or curved lines. The keys 210 may comprise one or more characters representative of input characteristics assigned to each key, e.g., alphabet keys, numeric keys, function keys, etc. The multiple key columns may be organized into one or more finger columns 240, an example of which is shown in FIG. 7. Each finger column 240 may be composed of a set of one or more key columns 200*a* and 200*b* that collectively form one contiguous region 250. If a finger column 240 contains more than one key column 200, these key columns collectively form a geometric grid, e.g., each key column 200*a*: (1) shares a column boundary 260 with at least one other key column 200*b*; and (2) the row boundaries 270 of 200*a* and 200*b* meet along the shared column boundary, forming continuous lines.

Finger Columns and the Columnar Region

Figure 8:
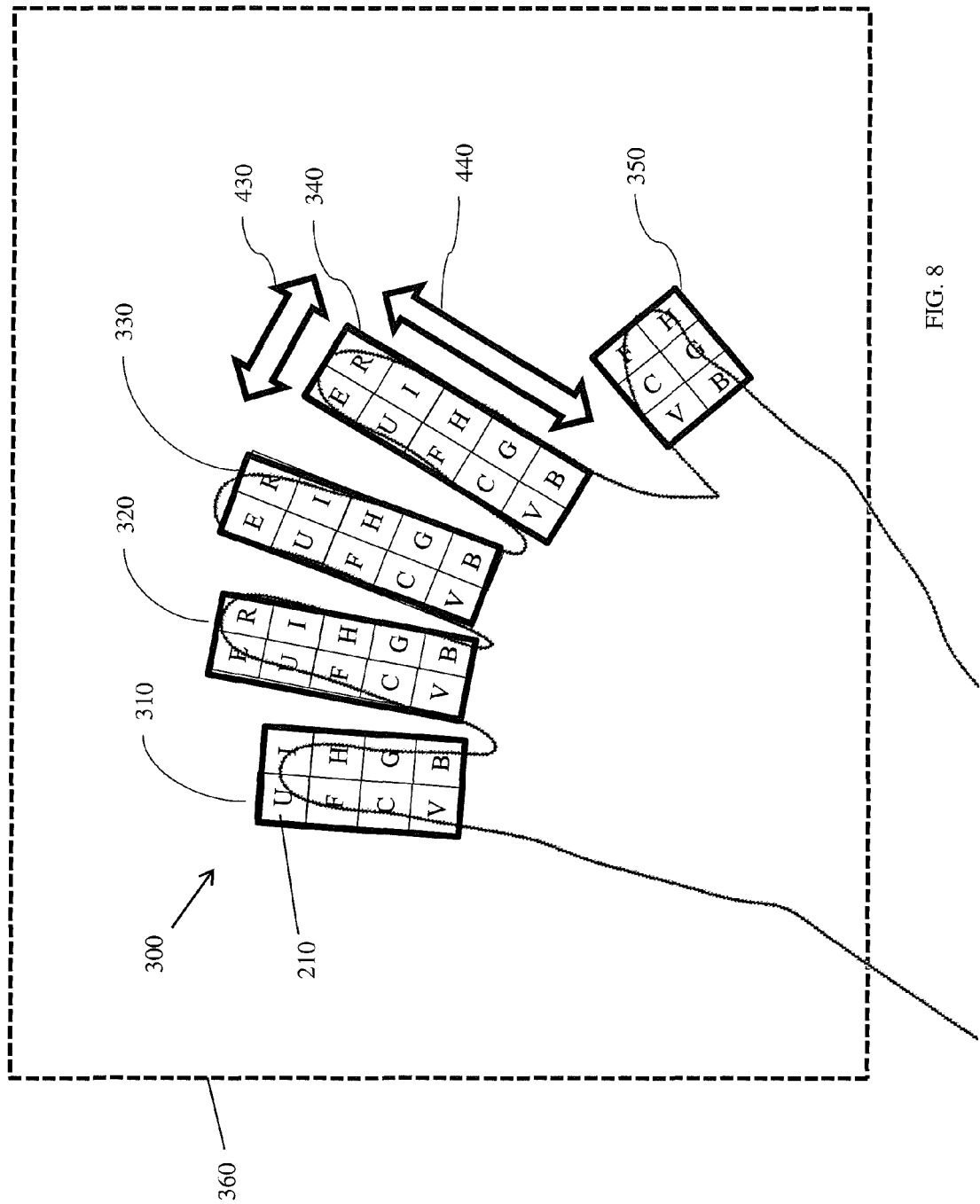
FIG. 8 shows an example of columnar regions associated with a user's fingers in accordance with some aspects of the invention.
Figure 9:
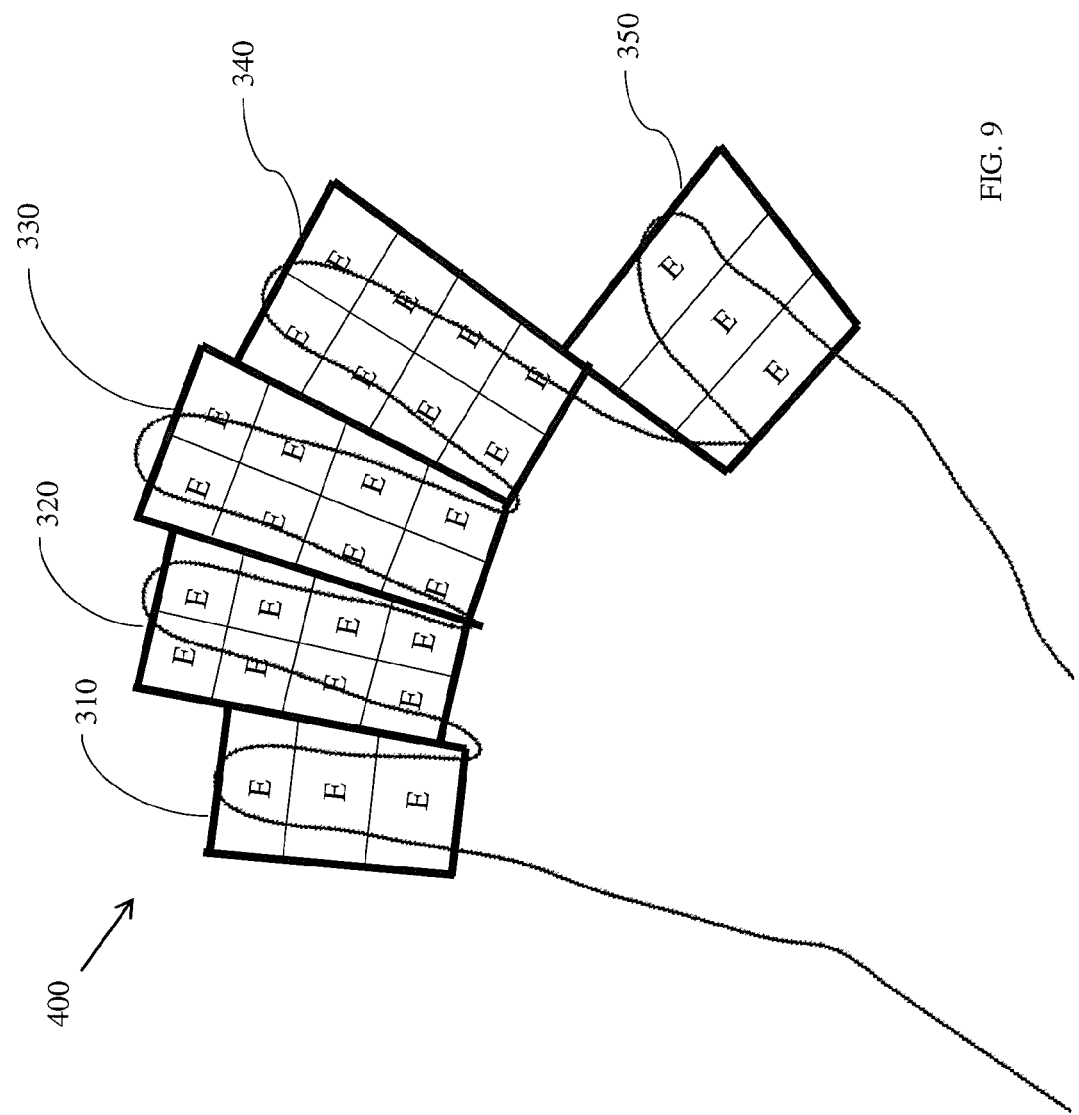
FIG. 9 shows an example of alternative columnar regions associated with a user's fingers in accordance with some aspects of the invention.
Figure 10:
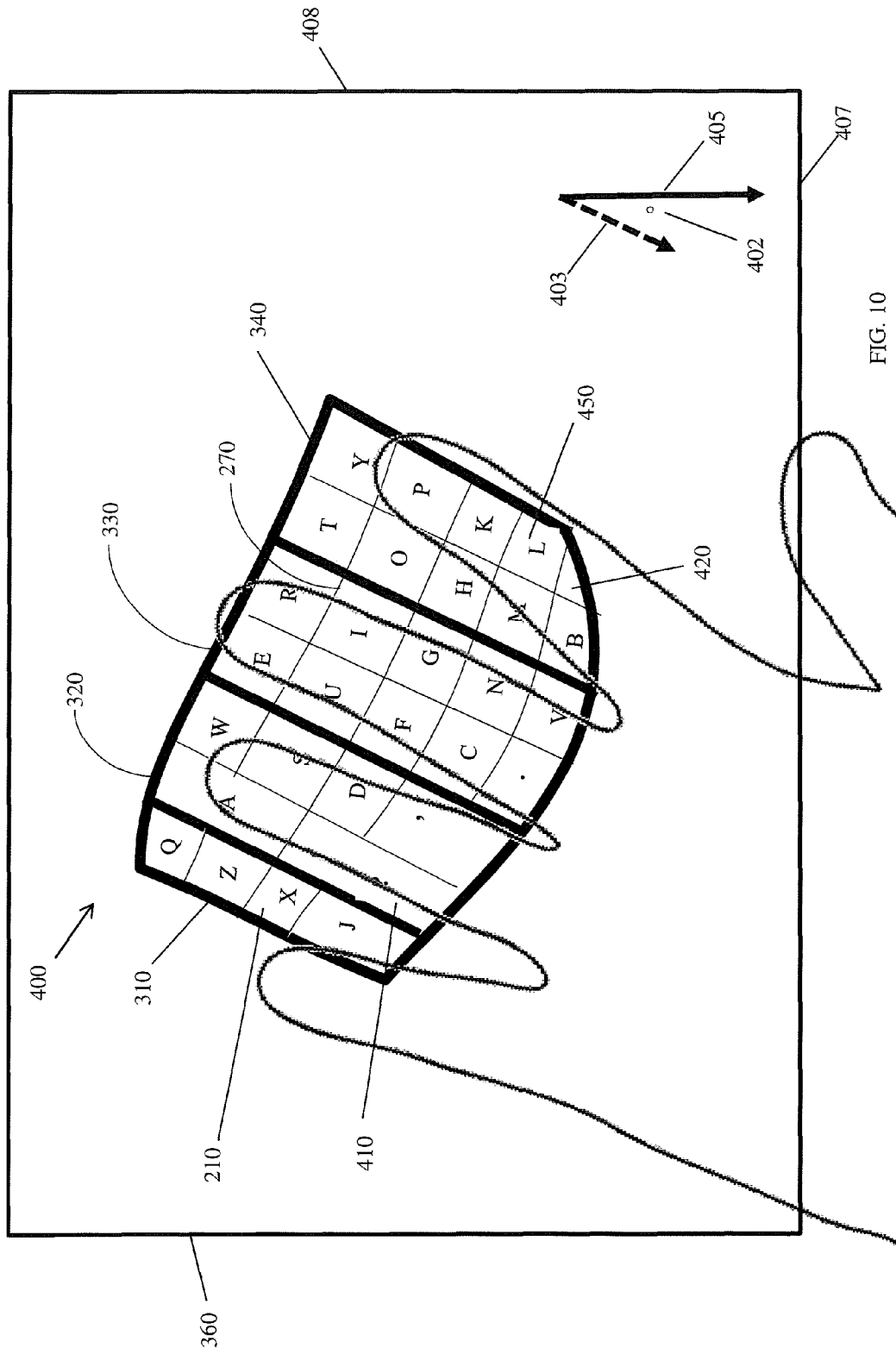
FIG. 10 shows an example of columnar regions as a grid in accordance with some aspects of the invention.

A set of finger columns can collectively be thought of as a region called the columnar region, examples of which are shown in FIGS. 8-10. More specifically, FIG. 8 shows a columnar region 300 comprising multiple sets of finger columns (310, 320, 330, 340, and 350) in accordance with one aspect of the invention in which each set of finger column (e.g., 310) is configured noncontiguous or unattached from the other set of finger columns (e.g., 320, 330, 340, and 350).

Alternatively, FIGS. 9 and 10 show a columnar region 400 comprising multiple sets of finger columns (310, 320, 330, 340, and 350) in accordance with another aspect of the invention in which each set of finger column (e.g., 310) is configured contiguous or attached to the other set of finger columns (e.g., 320, 330, 340, and 350). Moreover, FIG. 10 shows that in some embodiments of the present invention the finger columns (310, 320, 330, and 340) share row boundaries 270 such that the columnar region 400 forms a geometric grid. The keys 210 within the geometric grid may be configured at a same angle 402 (e.g., an angle of a user's hand in a resting position on the computing device as discussed in further detail below) and sloped 403 in a same or similar direction. In some embodiments, the angle 402 of the keys 210 is offset from perpendicular 405 to a base 407 of the computing device 408. FIG. 10 also shows that in accordance with some aspects of the invention the individual finger columns (310, 320, 330, and 340) need not have a same number of rows or columns.

As also shown in FIG. 10, in additional or alternative embodiments, one or more keys (e.g., 410) may be configured to occupy more than one square in a finger column (e.g., 310), or one key may be configured to occupy one or more squares in each of several finger columns (not shown), even if those finger columns are not physically contiguous. In another embodiment, some of the squares (e.g., 420) in a columnar region (e.g., 340) may be unused and/or undisplayed.

As shown in FIG. 8, each of the finger columns (310, 320, 330, 340, and 350) in the columnar region 300 may be associated with exactly one finger in the user's hand, such that all of the keys 210 in that finger column (e.g., 310) lie directly under the corresponding finger and are to be struck primarily by that finger (e.g., the pinky finger). Note that in some cases, not all fingers may be assigned a finger column, as shown in FIG. 10, in which the thumb has no finger column.

In some embodiments, to facilitate a finger striking the keys in its finger column, each finger column may be geometrically transformed via rotation, scaling, and/or translation, so that the finger column occupies a geometric space directly under the finger before the finger taps a key. This transformation process is called a columnar transformation. To compute the geometric space directly under the finger, the system assumes that the user's hand is in a rest position before typing, as shown in FIG. 8, in which the fingers and thumb of the hand are horizontal and extended over the touch surface 360, in a relaxed position. However, this assumption does not exhaustively determine a hand's geometric properties. As shown in FIG. 11, the user may be using either their left or right hand. As shown in FIG. 12, the hand may be rotated at any angle around the normal of the touch surface, which is referred to herein as the hand angle. As shown in FIG. 13, the hand may be located over any arbitrary location in the reserved entry area. Finally, as shown in FIG. 14, user hands and their associated fingers may vary in size (e.g., length and/or width) and shape.

The first variable, handedness as shown in FIG. 11, may be determined by a user-controlled setting (e.g., input in a user profile) such that the system has this information available. For example, the virtual keyboard module 150 may receive input comprising whether the user is left handed or right handed. To determine the other variables (shown in FIGS. 12-14), the system may either: (a) use an estimation process to estimate reasonable values for these geometric features; or (b) use a fitting process, an interactive method of detecting the features. Both of these methods are described in further detail herein. Given these geometric values determined via the estimation process and/or the fitting process, a model of the hand in rest position may be constructed and a rectangular area (e.g., a finger area) directly under each finger may be identified. Next, the finger column may be transformed such that the finger column occupies the appropriate finger area. Because each finger column is a rectangular geometric grid of keys, this may be a straightforward transformation of one arbitrary rectangle (e.g., the finger column) to substantially overlay another (e.g., the finger area).

Arranging the virtual keyboard as described above to include finger columns and corresponding keys that reside directly underneath and at the same angle as a user's fingers has important advantages. The most obvious advantage is that the arrangement promotes (one-handed) multi-finger typing, which may be faster than single-finger typing. The arrangement also promotes both typing accuracy and speed by individual fingers, because to strike any key in its finger column, each finger needs to move only a relatively small distance that is well within its natural range of motion. As seen in FIG. 8, because each finger column (310, 320, 330, 340, and 350) is long and thin, the finger needs to move only a very small distance 430 laterally left or right. Along the column axis, the movement distance 440 required from the finger is greater, but still within the finger's natural range of pulling motion towards the palm.

Accordingly, because the distance required for a finger to type the keys in its finger column is within its natural range of motion, keystrokes may be typed by moving the finger alone, with the rest of the hand staying nearly motionless. This is an improvement advantage over the Standard Virtual Keyboard, in which the shoulder and arm are used to move the entire hand into the general vicinity of a group of keys.

Advantageously, allowing the user to type without moving the entire hand boosts accuracy and speed, for a number of reasons. First, the arm and shoulder are relatively large body parts that have difficulty performing the micro-movements required for typing. Second, each class of movements in the typing process is a potential source of cognitive and/or biomechanical error, and eliminating an entire class should simplify the process and reduce the chance of error. Finally, simplifying and shortening the movements required to strike keys should make the layout easier to learn, especially with regard to learning muscle memories.

An additional advantage of the present invention is the prospect of "eyes-free" typing by visually-impaired users or in applications requiring visual attention to be focused away from the keyboard. The hand stability and short typing movements found in the present invention make it possible for a user to reliably strike keys without looking at them over an extended typing session, especially if the hand rests on a brace that keeps it positioned properly.

Fitting Process

One aspect of the present invention pertains to the fitting process for detecting the geometry of a user's hand and automatically fitting the columnar region to the hand. This process may be initiated in several ways, for example: (1) pressing a key (e.g., a reserved key); (2) by a more elaborate pattern of touch events distinguishable from ordinary typing (e.g., hand gestures on the virtual keyboard such as pinching between predetermined keys); or (3) as an option in a more extensive process of application configuration initiated using a key (e.g., a reserved key in a user profile), such as a Settings process in an application (e.g., the virtual keyboard module 150). In some embodiments, for the duration of the fitting process, to avoid undesired side effects, all normal typing functions may be suspended.

Figure 15:
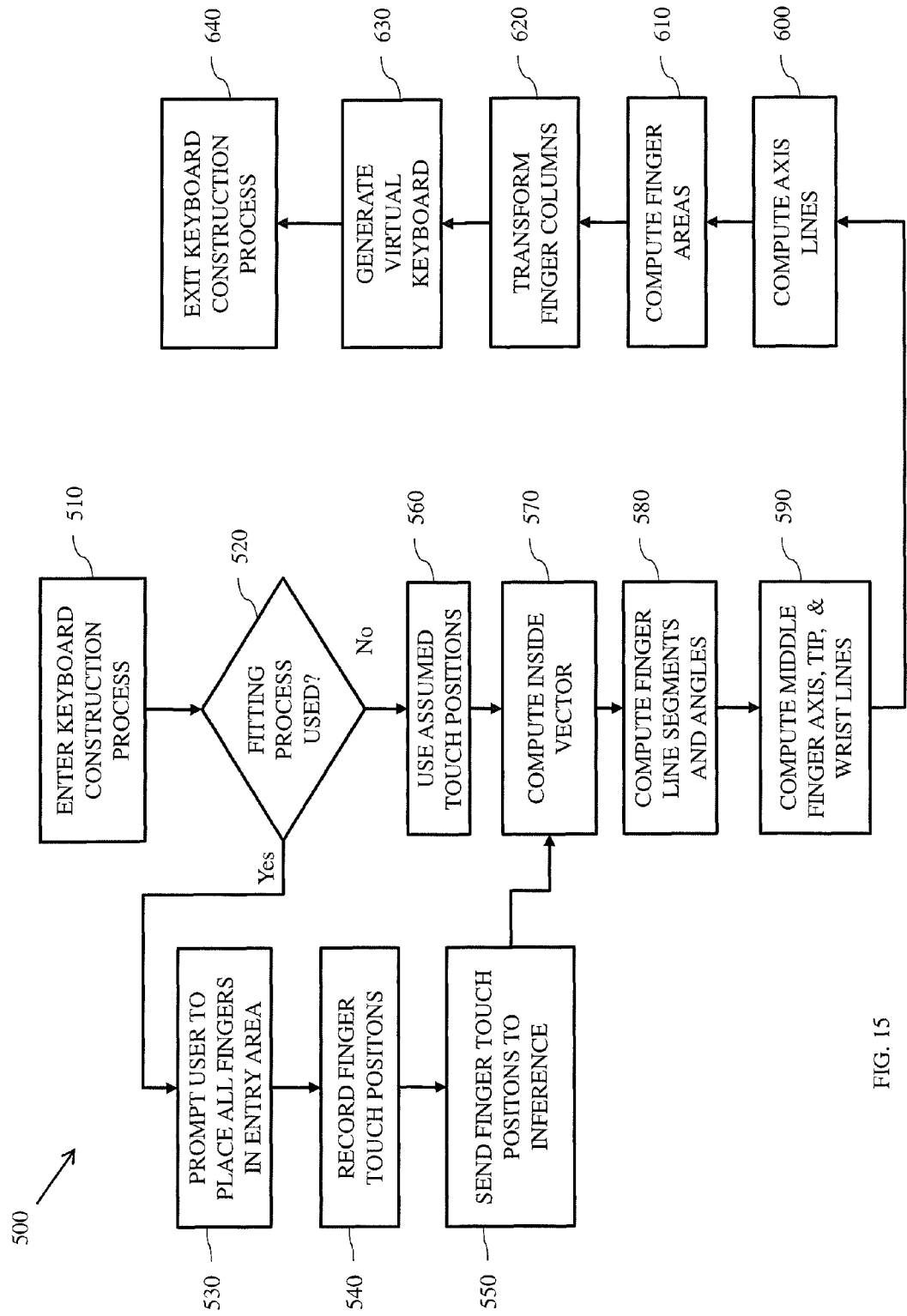
FIG. 15 shows an illustrative process flow for construction of a virtual keyboard in accordance with some aspects of the invention.

The fitting process may then proceed in two stages (e.g., the virtual keyboard module 150 may be configured to initiate the fitting process upon receiving any of the aforementioned means for initiation). The first is the detection of the user's hand geometry. This process may proceed by the user placing two or more fingers of their hand on the touch surface simultaneously, in a relaxed position, at a location of the touch surface at which they wish to type. This touch action may transmit to the system the locations of the user's fingertips. The fitting process may then proceed to the second stage of the process, in which the fingertip locations are used to fit the columnar region to the hand. This may be achieved by using a geometric model of a human hand that uses input fingertip locations to compute other hand and finger locations of interest. This model may be made by examining a set of actual human hands and noting mathematical relationships between various points in the hand. Using the model, the key points describing the areas directly underneath the user's fingers may be inferred, as illustrated in FIG. 15, and discussed in detail hereafter. As already stated, the finger areas may be used as the extents of the individual finger columns.

The fitting process has a number of advantages. First, human beings have differently sized and shaped hands, so any hand model produced by the estimation process may necessarily fit some users' hands inexactly. In contrast, a fitting process produces a hand model that much more accurately reflects an individual user's hand. The improved hand model should lead to increased typing accuracy. Second, a user may choose to change posture during a typing session, for example, from a seated position to a reclined position. Because a postural change may involve a change in arm position, the most comfortable rotational attitude of the hand to the touch surface can also change. In effect, the user's hand has been transformed by the posture change. Therefore, the fitting process enables the key columns of the columnar region to be easily re-fit to this "new" hand. Thus, the fitting process preserves user comfort as well as typing speed and accuracy.

Limiting Fatigue

Another aspect of the present invention pertains to allowing the user to limit fatigue in their hand by resting their fingers on the keyboard surface. This may be achieved by characterizing a certain sequence of finger touch events (e.g., finger gestures) as initiating a rest period and overriding a normal production of output characters thereafter. This override may continue until a second sequence of events is detected, concluding the rest period. In one embodiment, the sequence of events for initiating the rest event may comprise most or all of the user's fingers being simultaneously detected as having touched the touch surface. Similarly, the sequence of events for concluding the rest event may comprise all the user's fingers being simultaneously not touching the touch surface. Advantageously, providing for user initiated rest periods may limit fatigue in the user's hand by resting it on the touch surface without fear of mistakenly typing keys in so doing.

Rest Triggers Refitting

Another aspect of the present invention pertains to automatically initiate the fitting process whenever most or all of the user's fingers are simultaneously detected as having touched the touch surface. An advantage of this capability is that the user could conveniently re-fit the key layout to their hand, every few seconds if desired. Because sustained typing can cause the overall hand to drift slightly, thereby removing the fingers from over the finger columns, frequent easy re-fittings of the key layout may promote typing accuracy. This capability is especially useful for eyes-free typing, because any hand drift during such typing cannot be corrected by visually moving the hand back to the finger columns.

Contiguous Finger Columns

Another aspect of the present invention pertains to increasing the space occupied by the finger columns such that the space becomes contiguous, as shown in FIG. 9. For example, when this aspect is active, the two processes (i.e., the estimation process and fitting process) that transform finger columns to lie under the user's fingers may be altered. In this context, after transforming the finger columns to match the finger areas, the finger columns may be simultaneously widened such that their vertical boundaries touch each other. The resultant wider keys may be more tolerant of slight lateral movements by the fingers that might otherwise cause the fingers to strike outside their intended finger column. Because these movements are small, it may be likely that the wide key struck by the finger may still be the key the user intended to strike. Therefore, this aspect converts keystrokes that may ordinarily be typing errors into valid keystrokes, and thereby increases typing accuracy.

Columnar Region as Grid

Another aspect of the present invention pertains to constraining the keyboard construction process such that it constructs the columnar region to form a geometric grid, as shown in FIG. 10. When this aspect is active, the two processes (i.e., the estimation process and the fitting process) that transform finger columns to lie directly under the user's fingers may be altered. For example, these processes may be further configured to move the columns as close as possible to directly underneath the user's fingers, while still respecting the constraint that the columns must form a cohesive grid. Note that in some embodiments the individual key columns may be placed at different angles while still respecting the grid constraint. As show in FIG. 10, finger column 310 is the pinky finger column, finger column 320 is the ring finger column, finger column 330 is the middle finger column, and finger column 340 is the index finger column.

Advantageously, this grid layout is more similar in structure to the Standard Layout, because the row boundaries of two adjacent finger columns form a continuous line, as is found in the Standard Layout. As explained previously, visual similarity to the Standard Layout makes the grid layout more familiar and easier to learn and enables the transfer of muscle memories to the grid layout. Therefore, imposing a grid structure on the columnar region may result in an increase in typing speed and accuracy.

Curved Row Boundaries Layout

Another aspect of the present invention assumes the use of a geometric grid for the columnar region that controls the sizing of individual keys by using curved lines for the row boundaries of key columns, as shown in FIG. 10. In general, making a key larger makes it easier to strike. Since some characters are typed more frequently, assigning these characters to keys that are larger can increase overall speed and accuracy. One method of making some keys larger than others is to use curved lines for row boundaries, as seen in FIG. 10. For example, some keys in the same row may have significant size differences (e.g., see keys 410 and 450). This size variation may be achieved while still maintaining smooth, continuous column and row boundaries in the grid. As explained previously, smooth column boundaries are necessary to allow columns to match finger widths, while smooth row boundaries help preserve visual similarity to the Standard Layout. The columnar region 400 in FIG. 10 may be contrasted with the columnar regions from FIGS. 8 and 9, which do not use smooth row boundaries between finger columns. These layouts are less cohesive and their similarity to the Standard Layout is harder to recognize. Advantageously, the present grid aspect allows differently sized keys, thereby boosting typing accuracy and speed, while maintaining a visual similarity to the Standard Layout, thereby easing user learning of the new layout.

Dexterous Fingers Layout

Another aspect of the present invention concerns adjusting details of the key layout such that individual fingers are given typing responsibilities that are proportional to their differing dexterities/agilities, e.g., a form of load balancing leading to greater overall accuracy and speed. In the human hand, the thumb and index fingers are more dexterous and agile than the other three fingers. Of the remaining three fingers, the middle finger is more dexterous than the ring finger, which is more dexterous than the pinky finger. There are several ways in which the keyboard layout can be tailored to these differing finger dexterities. First, a more dexterous finger A can be used in preference to a less dexterous finger B, by allocating keys to A and B so that the combined probability of one of As keys being struck is greater than the corresponding probability for B's keys. This may be accomplished either by allocating fewer total keys to B than to A, or by using B's keys to output characters that are less frequently used than are the characters output by A's keys. In FIG. 10, an example of this preference is shown, in which the index finger column 340 and middle finger column 330 are used to strike more keys than the ring finger column 320 and pinky finger column 310. For example, the index finger column 340 comprises 9 keys, and the middle finger column 330 comprises 10 keys. In contrast, the ring finger column 320 comprises only 6 keys, and the pinky finger column 10 comprises only 4 keys.

Alternatively, the layout may compensate for the reduced dexterity of finger B by enlarging the size of some or all of the keys it is responsible for striking. This can be achieved by making some keys larger using the curved row boundaries described above, or alternatively by allowing some keys to occupy multiple spaces in the grid. In FIG. 10, the ring finger column 320 comprises key 410 that occupies two and sometimes three grid spaces, making these characters easier to type.

Construction of a Virtual Keyboard Flow Diagram

FIG. 15 shows an exemplary flow for performing aspects of the present invention. The steps of FIG. 15 may be implemented in the environments and systems described herein with respect to FIGS. 5-14, for example. The flowchart and block diagrams in FIG. 15 illustrate the architecture, functionality, and operation of possible implementations of systems, methods and computer program products according to various embodiments of the present invention.

In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

More specifically, FIG. 15 depicts an exemplary flow 500 for a process of establishing construction of a virtual keyboard in accordance with aspects of the present invention. This process includes the estimation process and optional the fitting process described herein. The present process discussion assumes that the four non-thumb fingers are used in this process, but extensions of the processes describe herein may be extend to handle the thumb, or to handle fewer fingers, as should be understood by those of ordinary skill in the art.

Upon invocation of the keyboard construction process at step 510, as described herein, the system determines at step 520 whether a fitting process is being initiated. If so, the program jumps to step 530, in which the user is prompted to place a predetermined number of figures (e.g., four fingers in a rest position) at some location on the touch sensitive surface where the user wishes to invoke a virtual keyboard. The system waits for the predetermined number of fingers to press on the touch sensitive surface, and records the positions of the touch points at step 540. At step 550, the system sends the recorded points for further processing to an inference process, which begins at step 570.

Alternatively, if the system determines at step 520 that a fitting process is not being used, then at step 560 the system initiates the estimation process in which knowledge of human hand geometry is used to infer the touch point positions most likely to be useful. These touch points are sent to the inference process, which begins at step 570.

Figure 16:
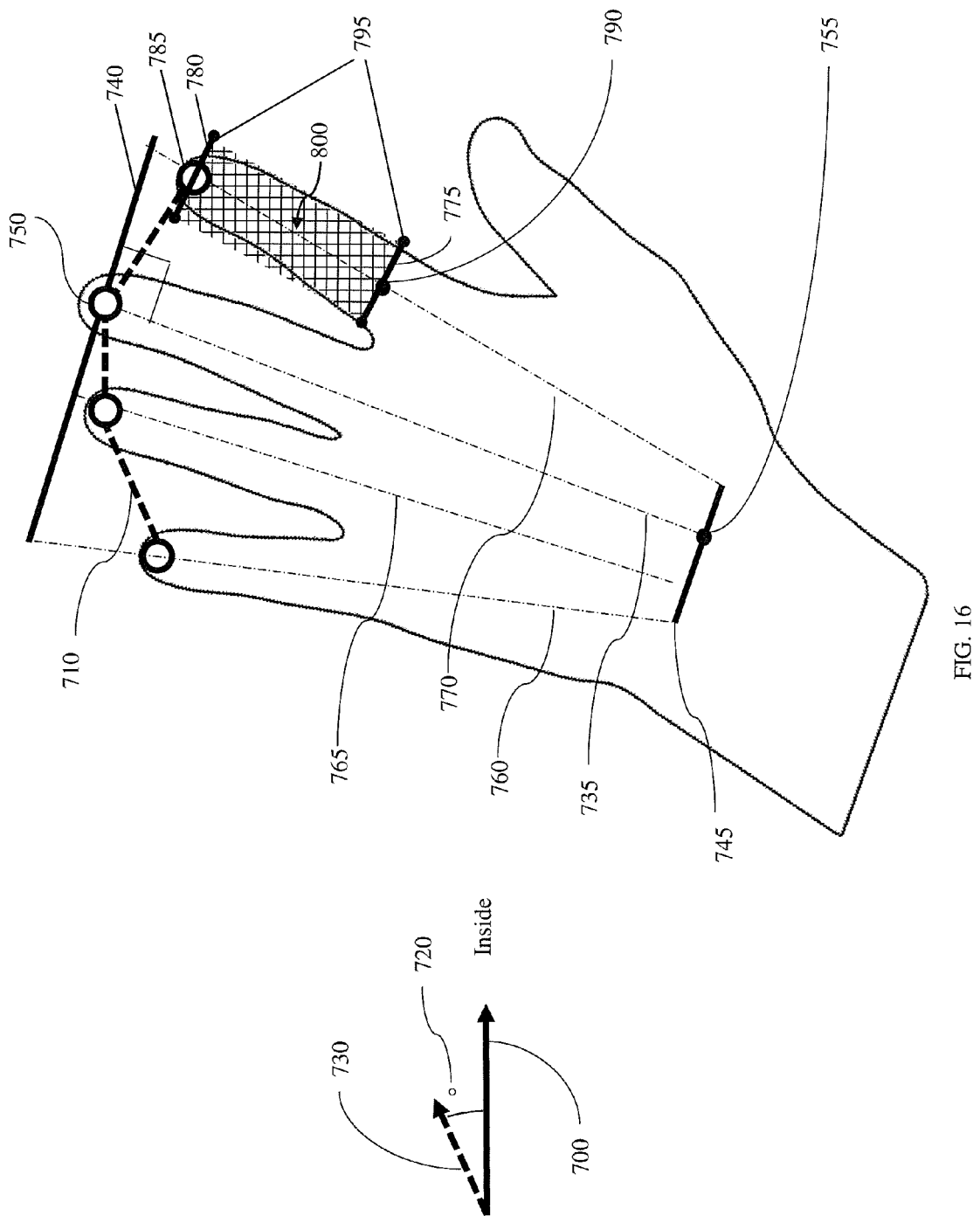
FIG. 16 shows an example estimation process in accordance with some aspects of the invention.

At step 570, the system retrieves or receives a current handedness setting (as discussed above) to label the left and right sides of the touch surface. If the handedness is set to Left (as in FIG. 16), the left side of the touch surface may be labeled inner and the right side may be labeled outer. If handedness is set to Right, these labels may be reversed. As should be understood any labels may be used in the spirit of the invention so long as the two sides of the touch surface are distinguishable. The system is then configured to construct a vector 700 as shown in FIG. 16, (e.g., an inside vector), for later use in constructing angles. The inside vector points from a center of the touch surface to the inner side, which may be the right side as depicted in FIG. 16, because the user is left-handed.

At step 580, the system computes a sequence of finger line segments (the heavy dashed lines 710 as shown in FIG. 16). For this purpose, the system may order the received touch points in a line stretching generally from the point closest to the outer edge to a point closest to the inner edge. Since the points do not always proceed directly from outer to inner, the ordering may be made more robust by (1) detecting, for each touch point, the points that are closest to it; and (2) modifying the order, if needed, so that it reflects these distances.

Once an ordering has been constructed, the system constructs a finger line segment from each pair of successive points in the ordering. For each finger line segment, the angle made by the finger line segment and the inner vector may be computed. For example, as shown in FIG. 16, an exemplary finger line angle 720 may be computed that comprise the angle between the inner vector 700 and the finger line segment 730.

At step 590, the computed finger line segments and finger line angles are combined with the current handedness setting (Left or Right) and knowledge of typical hand geometry to infer three lines, e.g., a finger axis 735, a tip line 740, and a wrist line 745, as shown in FIG. 16. For example, the defining properties of the middle finger axis may be computed as follows. The beginning point for the middle finger axis may be determined as point 750, or the middle finger touch point. The angle of the middle finger axis 735 with respect to the inner vector may be inferred as a function of the set of finger line angles 720 and the handedness, e.g., this function may be substantially near to an average of these angles. The length of the middle finger axis 735 may be computed as a function of the lengths of the finger line segments 710. Therefore, since all of the defining properties of the middle finger axis are known for the middle finger axis 735, the point 755 terminating the middle finger axis may be inferred.

The system may also compute the defining properties of the tip line 740 and the wrist line 745. For example, these lines are parallel, and their angle with respect to the inner vector is known, as both lines are perpendicular to the middle finger axis. The lengths of the tip line 740 and the wrist line 745, and their exact placement on points 750 and 755, respectively, may be computed as a function of the lengths of the finger line segments 710 and the handedness.

At step 600, remaining axis lines for the pinky, ring, and index fingers may be computed (e.g., see pinky axis line 760, ring finger axis line 765, and index finger line 770). In some embodiments, the axis line for any given finger may be calculated as the shortest line between the tip and wrist lines that passes through that finger's touch point. This calculation should be straightforward to compute, because the system now knows all the variables. The thumb's axis line is not shown in FIG. 16, but its computation should be a straightforward extension of these methods.

At step 610, the previously computed finger axis lines are used to compute the various finger areas. The computation of the defining properties of the finger area for the index finger is presented as a representative example. The base boundary line 775 and the tip boundary line 780 for this finger may be computed. For example, these are parallel lines, and each line is bisected by and perpendicular to the index finger axis line 770. Therefore, the angle of these lines is known. The lengths of these lines are held to be an estimated width of the index finger. This width may be estimated using knowledge of hand geometry and the lengths of the finger line segments.

The tip boundary line 780 may be bisected by the index finger touch point 785, such that its location may be known. As stated before, tip boundary line's 780 angle and length are already known too. The remaining variable is the location of the base boundary line 775, whose angle and length are already known. To fix the base boundary line 775 in space, the system may be configured to compute an index finger base point 790, which lies at the base of the index finger on the index finger axis 770. This point may be calculated by moving from the index finger touch point 785 along the index finger axis 770 a distance equal to the length of the index finger. This distance may be estimated from the lengths of the finger line segments. Once the index finger base point 790 is known, the base boundary line 775 may be fixed in space. Now that the base boundary line 775 and tip boundary line 780 are determined, the four endpoints 795 of these two lines may be located. These four endpoints 795 may then be used to bound or define the finger area 800 for the index finger.

Using the computed finger areas from step 610, the finger columns (e.g., finger columns 310, 320, 330, and 340) as described above with respect to FIGS. 7-10) for each finger may be transformed at step 620 such that the finger column boundaries match the finger area for the corresponding finger. Since the finger column is a grid, the process may include a mapping of a grid onto a rectangle such that the finger columns lie directly under the corresponding fingers.

At step 630, once the full geometry of the finger columns is available, the system generates the virtual keyboard geometry and assigns characters to keys using a pre-loaded or customized layout. At step 640, the keyboard construction sequence is exited. In some embodiments, the generated column and key layout can be saved to computer readable storage memory by the user, and later loaded for re-use.

Background Region

Another aspect of the present invention allows for the use of space in the reserved entry area that is not taken up by the columnar region to be used for additional keys, while still supporting the arbitrary transformation (and especially rotation) of the columnar region described herein. In this aspect, two layers of keys may be used in tandem. These layers are individually shown in FIG. 17. One layer comprises the columnar region 810 and the second layer comprises the background region 820. In some embodiments, the background region 820 may comprise all the space in the reserved entry area and may be divided into discrete closed shapes composed of straight and/or curved lines. Each shape may be configured as an input key.

Figure 18:
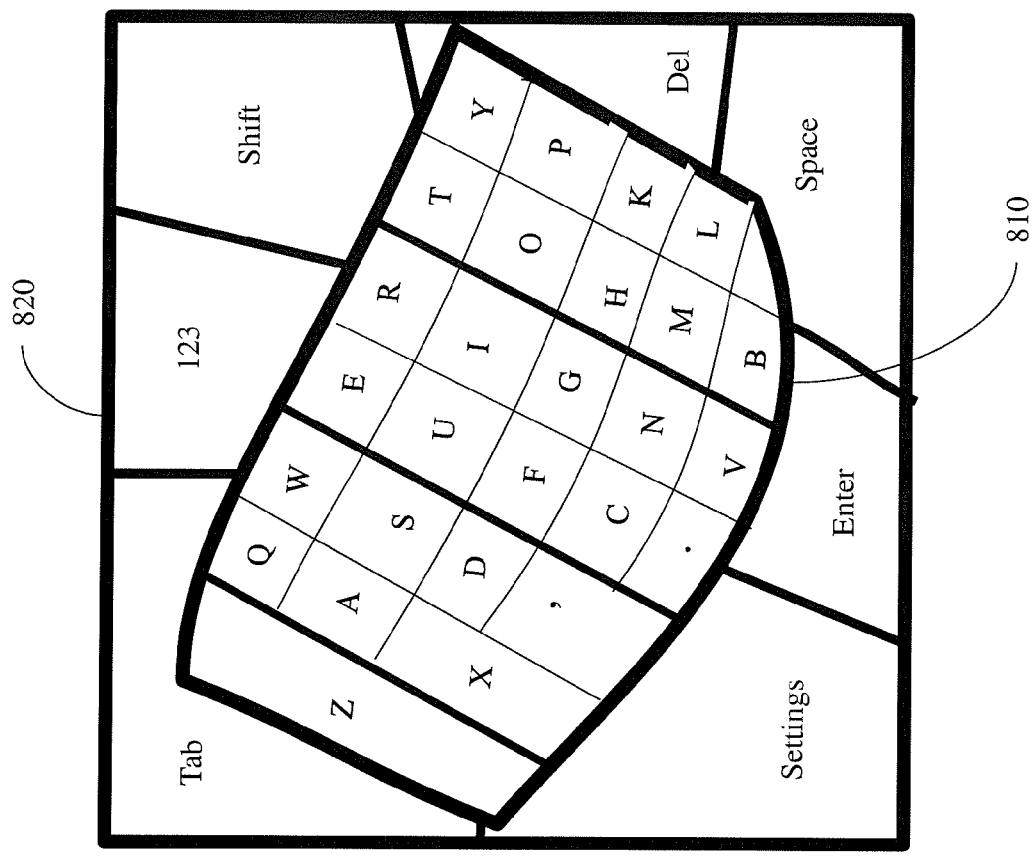
FIG. 18 shows an example columnar region floating over a background region in accordance with some aspects of the invention.

In the aspect shown in FIG. 18, the columnar region 810 "floats" over the background region 820 such that the columnar region 810 may be oriented (e.g., rotated via transformation) over the background region 820. Operationally, any touches by user fingers that are within the columnar region 810 may only be applied to keys in that region. Finger touches not within the columnar region 810 may be applied to the keys in the background region 820. Keys in the background region 820 may not be intended to be struck by any particular finger. Instead, these keys may be struck by whichever finger is available. This arrangement has the advantage of allowing the space in the reserved entry area that is not taken up by the columnar region 810 to be used for additional keys, eliminating the need to represent these keys in a secondary, invoked keyboard. Consequently, this promotes overall typing speed and keyboard learnability.

Figure 19:
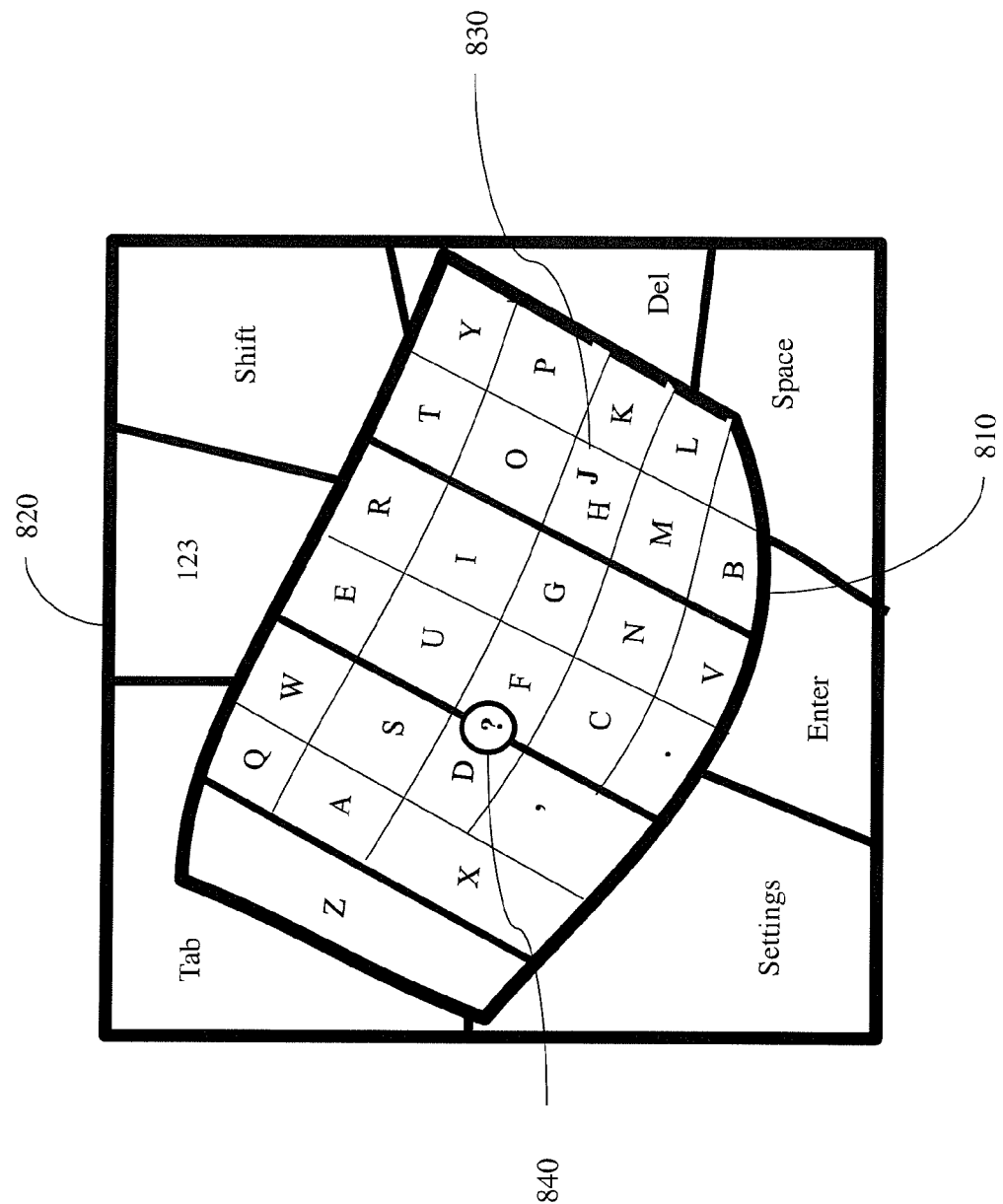
FIG. 19 shows example gestures in accordance with some aspects of the invention.

While any desired arrangement may be used for the keys in the background region 820, the arrangement shown in FIG. 19 involves the use of large keys arranged around the periphery of the background region 820. An advantage of this arrangement is that many possible rotations, translations, and scalings can be used to re-fit the columnar region 810, without fully obscuring any of the keys in the background region 820. Therefore, the columnar region 810 can be almost arbitrarily transformed to accommodate user needs while still allowing all background region 820 keys to be typed.

Gestures

In another aspect of the present invention, particular gestures made from sequences of finger interactions with the touch surface may be used to trigger the output of distinct character sequences. This has an important advantage of allowing additional characters to be output using the primary input screen (e.g., the columnar region 810 and the background region 820), without invoking a secondary input screen. Provided the gestures are carefully defined, the gestures can be quite fast to type. For example, a double-tap of the same key often takes less than twice the time needed to perform a single tap of that key. For these reasons, using gestures should provide a significant boost in typing speed.

Gesture use comprises three concepts: a finger event, an event stream, and a gesture pattern. A finger event may be a discrete interaction between one finger and the touch surface. Each finger event may be one of the following finger event types: (1) a touch event, in which a finger previously not touching the touch surface touches it; (2) a move event, in which a finger touching the touch surface moves along that surface; and (3) a lift event, in which a finger touching the touch surface lifts off of it. Note that the host touch device should be configured to notify the present invention of finger events as they occur and basic information about the finger event including its exact time and its location on the touch surface. The device should also be configured to indicate that a sequence of finger events was caused by the same finger, up to and including when that finger leaves the touch surface (e.g., via a lift event).

A finger event stream may be a sequence of finger events caused by the same finger. An event stream may involve the finger lifting off the touch surface multiple times. However, the host touch device may not be configured to inform the present invention that multiple sequences of events, each terminated by a lift event, were actually caused by the same finger. Therefore, the present invention may make this determination, as follows. For example, in the instance that finger event sequence S1 ends with a lift event T1. Finger event sequence S2 may begin with a touch event T2. If event T1 preceded T2 by some predefined time period, and if T1's location was within a predefined distance from T2's location, then the two event sequences may be held to be part of one larger event stream consisting of S1 followed by S2.

A gesture pattern may be defined as a particular pattern of finger event types and constraints that a particular event stream may either match or not match. A gesture pattern may be represented as: (1) a sequence of finger event types; (2) a set of temporal constraints upon events in the sequence; and (3) a set of spatial constraints upon events in the sequence. For an event stream to match a gesture pattern, the keystroke's sequence of finger events should match the pattern's sequence of finger event types. Furthermore, the sequence of finger events should obey the temporal and spatial constraints.

For example, a particular gesture pattern P might define a double-tapping motion. In this instance, P's sequence of finger event types may be <Touch, Lift, Touch, Lift>. In order to model the rapidity of double-tapping, the temporal constraints might require that each event follow its predecessor within a certain amount of time, e.g., 300 milliseconds. As another example, a second gesture pattern Q might model a double-tap in which the user's fingers unintentionally move a slight distance before lifting. In this instance, Q's event pattern may be <Touch, Move, Lift, Touch, Move, Lift>. The temporal constraints would remain the same, but spatial constraints may be added requiring that each move action moved the fingers no more than a certain distance, e.g., 5 pixels distance.

In some embodiments, a gesture pattern may be used for typing by associating it with some output sequence of characters, e.g., "a", or "123". If gesture pattern P is associated with character sequence S, then whenever an event stream matching P occurs during input, the system may output sequence S to the host device (e.g., computing device 114).

A gesture pattern may also typically, though not necessarily, be associated with some pre-defined starting region in the entry area, which might or might not be a discrete key region defined in the layout. When associated with a starting region, a gesture pattern begins by touching the starting region, e.g., the pattern's finger event type sequence starts with a touch event, and the spatial constraints specify that this first touch event should be within the associated region. Associating gesture patterns and starting regions in this way allows the same finger event type sequence (e.g., double-tap) to be used in many gesture patterns without introducing possible ambiguity between two gesture patterns. This is advantageous, since only a small set of distinct finger event type sequences (e.g., double-taps, scrolling motions, etc.) can be typed quickly enough to make them useful. Note that one region can be associated with several distinct gesture patterns. A further advantage of associating a gesture pattern with a starting region is that a symbol indicating the availability of the gesture could be displayed in the region. For example, one key region may be marked with several symbols, one of which is the character it produces from conventional tapping, while the others denote symbols that can be produced using various gestures.

As mentioned above, this system may introduce gestural ambiguity, in which some event stream S matches two gesture patterns P and Q. This can occur when P's finger event type sequence is a prefix of Q's sequence, e.g., Q's sequence consists of P's sequence with extra finger event types appended. This problem may be resolved using two techniques. First, the system may try to match longer patterns in preference to shorter ones. Therefore, the system delays matching S with P until either (1) further touch events added to S show that S cannot match Q; or (2) a subsequent period of temporal delay shows that S does not satisfy Q's constraints, and so cannot match Q.

Second, gesture patterns may carefully be defined to be distinguishable and temporally constrained, eliminating the possibility of ambiguity. For example, the simple taps used for conventional typing can be distinguished from the double taps described above by requiring that the second tap of the double tap gesture pattern occur within some small time limit, e.g., 300 ms. In this way, two successive taps upon key K that are widely spaced in time can be determined to constitute two separate keystrokes, instead of one.

FIG. 19 shows a layout in which a label 830 indicates a double-tap gesture pattern associated with the "H" key. If the user executes a rapid double-tap motion upon this key, the system will output a "J", instead of the "H" produced by a simple tap. Thus, FIG. 19 illustrates the ability to overload a key with one or more gesture patterns, increasing the total number of characters available on the primary input screen.

Multi-Finger Gestures

A further embodiment of the gesture system would involve multi-finger gestures. In this aspect, a gesture pattern could contain multiple sequences of finger event types, where each sequence is performed by a different finger. This embodiment has the advantage of allowing even more characters to be output using (relatively) fast keystrokes, without invoking a secondary input screen, and therefore promotes typing speed. While many variations of the present invention could be useful, one variation that is particularly useful has the property that all of the type sequences are identical, e.g., each of the fingers may be performing the same motions. This general idea can be elaborated using temporal and spatial constraints, such that the different fingers are acting in unison, and are moving the same directions and distances. A multi-finger gesture pattern could usefully be associated with one or more starting regions, such that the various fingers could begin their actions by touching their particular associated region.

FIG. 19 shows a label 840 indicating a multi-finger gesture pattern associated with the "D" and "F" keys. If, using two fingers, the user may tap both these keys simultaneously, the system may output a "?" character. FIG. 19 thus illustrates how multi-finger gestures can further increase the total number of characters available on the primary input screen.

Character Entry Process Flow

Figure 20:
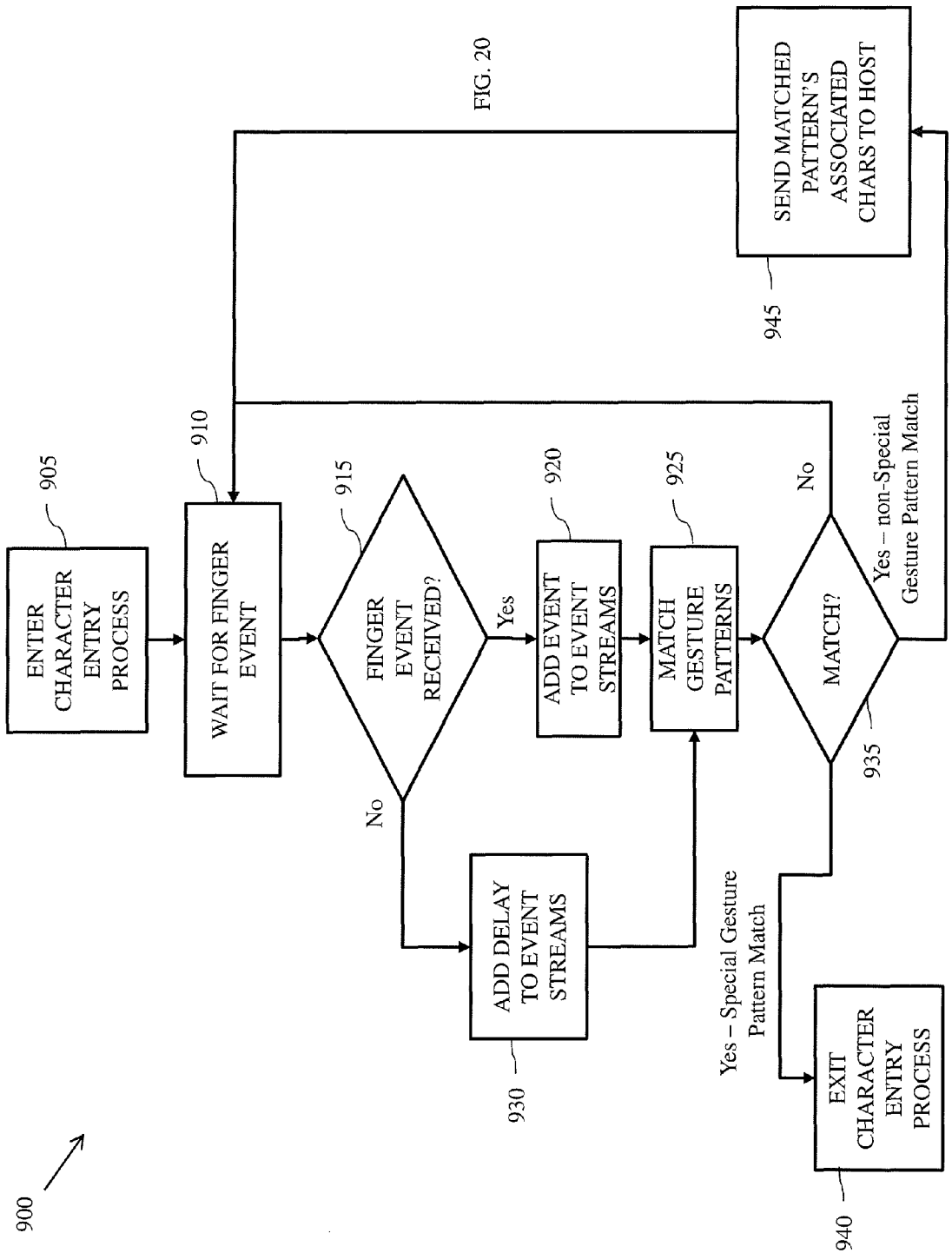
FIG. 20 shows an illustrative process flow for character entry in a virtual keyboard in accordance with some aspects of the invention.

FIG. 20 shows an exemplary flow for performing aspects of the present invention. The steps of FIG. 20 may be implemented in the environments and systems described herein with respect to FIGS. 5-19, for example. The flowchart and block diagrams in FIG. 20 illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions The above framework of a gesture system is used hereafter for describing the process by which the present invention is used to type characters into a host computer system (e.g., computing device 114). As should be understood by those of ordinary skill in the art because conventional key taps can be implemented as (simple) gestures, all character entry may be described as a process of gesture matching that optionally may support gestures that are more elaborate than simple taps.

More specifically, FIG. 20 depicts an exemplary flow 900 for character entry using systems of the present invention. At step 905, the system enters a character entry process, initializing two data structures. The first is a gesture patterns table, which is initialized with a set of gesture patterns (e.g., predefined or customized) loaded from a computer readable storage memory. For each key in the layout, the gesture patterns loaded from the computer readable storage memory may include one gesture pattern associated with that key that models a simple tapping keystroke. If more elaborate gesture patterns are supported, these may be included in the patterns loaded from the computer readable storage memory. The second structure may be an empty event streams table. Once these structures are initialized, the system moves to step 910, in which it may wait a delay period for the host device to report a new finger event. When the delay period ends, or when a new finger event is received, the system moves to step 915. In this step, if a new Finger Event was received before the delay period concluded, the system moves to step 920, in which the finger event is processed and added to the relevant event stream. For example, the system may be configured to determine the type of the finger event. If the finger event is of type touch, the system may use the logic described in the gestures section to determine whether this finger event continues an existing event stream in the event stream table or not. If it does not, a new event stream containing the touch event may be created and added to the event streams table. If the finger event does continue an existing event stream, the event may be appended to the existing event stream. If the finger event E is of type move or lift, E may be appended to the appropriate event stream that was caused by the same finger. This event stream may already reside in the event streams table. The system then moves to step 925.

At step 915, if the delay period expired with no finger event reported, the system moves to step 930. In step 930, the delay information may be added to each event stream in the event streams table, such that a full temporal chronology of that event stream may be available. The system then moves to step 925.

At step 925, the system compares each event stream in the event streams table with each defined gesture pattern in the gesture patterns table. This comparison tries to find a single-finger match of some event stream S with some gesture pattern P. A single-finger match between S and P occurs when some subsequence S1 of S is found such that: 1) S1 matches P's sequence of finger event types; and 2) S1 obeys P's spatial and temporal constraints; and 3) S1 could not be extended by future finger events so that it could match some other gesture pattern Q in the gesture patterns table. Condition (3) can occur either: (a) because S1 contains a sequence of finger events that already does not match Q's sequence of finger event types; or (b) S1 violates spatial or temporal constraints found in Q. The set of gesture patterns should be carefully defined so that only one successful single-finger match can be detected between any event stream S and gesture pattern P in any one invocation of step 920.

If the system supports multi-finger gesture patterns, in step 925 the system also looks for a multi-finger match. A multi-finger match occurs between a set of event streams SSet and a multi-finger gesture pattern P when: 1) for each event stream S in SSet, some subsequence S1 of S matches one of P's sequences of finger event types; and 2) the subsequences obey P's spatial and temporal constraints; and 3) the subsequences could not be extended by future finger events so that they could match some other multi-finger gesture pattern Q. Again, all the gesture patterns should be defined such that only one match (either of a one-finger gesture pattern or of a multi-finger gesture pattern) can be detected in one invocation of step 925.

Special gesture patterns may be defined that trigger special system processes when matched. For example, the aspect supporting a rest period may be triggered by a gesture in which all the fingers touch the touch surface and do not move for some temporal period. Matches of these gesture patterns may be detected normally.

At step 935, the system considers its reaction to the results of the search for matches. In the instance that no matches were detected in step 925, the system jumps back to step 910, to wait for another finger event. In the case that a special gesture pattern was matched in step 925, the system moves to step 940, which exits character entry and which may invoke functionality relevant to the matched special gesture pattern.

At step 935, in the case that a match of a non-special gesture pattern P was detected in step 925, the system moves to step 945. In step 945, the relevant matching subsequences of the matching event streams are removed from those event streams. Then, the character sequence associated with the matched gesture pattern may be sent as input to the host computing device. After this, the system jumps back to step 910 to wait for another finger event.

Figure 21:
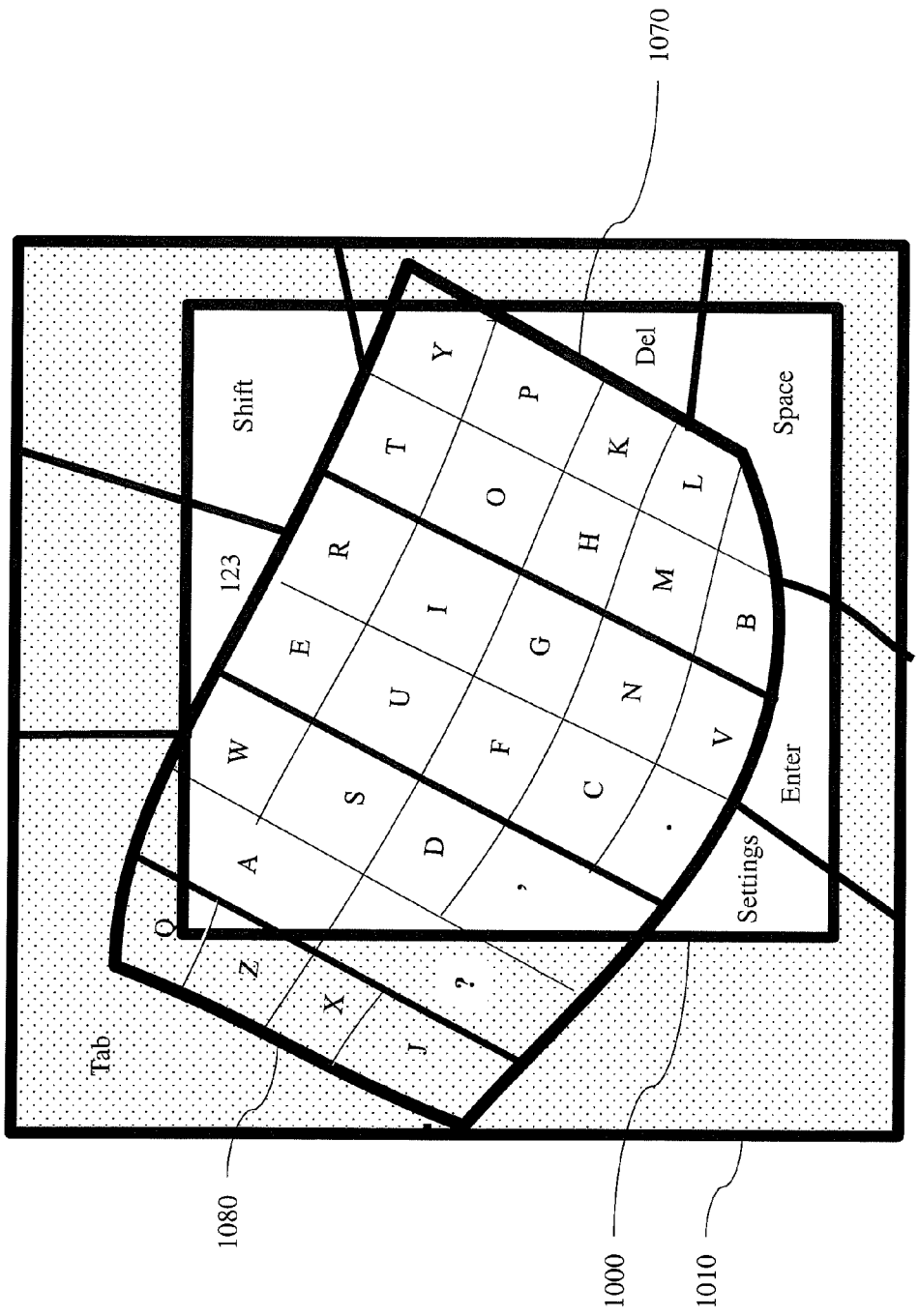
FIG. 21 shows masked and unmasked regions in accordance with some aspects of the invention.

In another embodiment, the present invention may be used as the virtual keyboard system for both a space-constrained computing device (e.g., a smartphone) and a non-space-constrained computing device (e.g., a tablet). This embodiment is similar to the prior embodiments, including the advantages, except for as follows. The present embodiment alters the keyboard layout to enable it to function effectively on both devices. In particular, on a smartphone, the columnar keyboard layout may be cropped or masked as in FIG. 21, so that only a portion of the full layout is displayed and used. For example, the displayed used portion or unmasked region 1000 with appropriate scaling may be configured to fit within the width of a portrait-oriented smartphone without use of the undisplayed unused portion or masked region 1010.

In some embodiments, the display size (e.g., width) of a computing device configured to implement the columnar keyboard layout of the present invention may be determined. The display size may then be compared to a predetermine threshold comprising a minimum size of display that may be configured to display the full columnar keyboard layout. When the display size of the computing device is not greater than or equal to the predetermined threshold, the displayed used portion or unmasked region 1000 may be generated on the display of the computing device. When the display size of the computing device is greater than or equal to the predetermined threshold, the full columnar keyboard layout comprising the displayed used portion or unmasked region 1000 and the undisplayed unused portion or masked region 1010 may be generated on the display of the computing device.

On a tablet, the full layout, including both the masked region 1010 and the unmasked region 1000, may both be displayed and used. FIG. 22 shows the unmasked region 1000 as it appears on a smartphone 1050, as well as the combined unmasked region 1000 and masked region 1010 as they appear on a tablet 1060.

Returning to FIG. 21, a portion 1070 of the columnar region may be comprised in the unmasked region 1000 (e.g., an unmasked columnar region), as opposed to a portion 1080 of the columnar region, which may be comprised in the masked region 1010. In some embodiments, the unmasked region 1000 comprises keys that include the most frequently used characters from the Standard Layout. For example, the 30 characters included in the unmasked region 1000 in FIG. 21. Based upon various estimates of character typing frequency in English, these characters collectively may be typed approximately 95% of the time, while the remaining characters in English may only be typed 5% of the time. The present embodiment places some or all of the remaining low-frequency characters in the masked region 1010, so that when the layout is used on a tablet, these characters can be typed without invoking a secondary input screen. The same low-frequency characters may also be placed on a secondary input screen, so that a smartphone or tablet user could type those keys by invoking that screen.

Advantageously, the present embodiment allows the most frequently used characters in the Standard Layout to be typed on a smartphone, using all the advantages of the columnar layout described in the prior embodiments. The columnar advantages include increased typing accuracy and speed, faster learning, and potential eyes-free use. These keys may be typed using the primary input screen, without invoking a secondary input screen, thereby boosting typing speed.

A further advantage of the present embodiment is a user who learns the layout of the unmasked region can use it on both smartphone and tablet devices, instead of having to learn different layouts for both. While a user may also choose to learn the layout of the masked region for use on a tablet, this is optional, and intended for convenience. The user could instead use only the unmasked region and an invoked secondary input screen, just as they would on a smartphone. Therefore, the present embodiment allows a user to learn only one layout, the unmasked region layout, which can be used on both smartphone and tablet.

Constrained Columnar Transformations

Another aspect of the present invention pertains to columnar transformations of the finger columns used in the unmasked region. Since the unmasked region is space-constrained, supporting arbitrary keyboard transformations in a fitting process could lead to transformed layouts in which much of the columnar region is not visible or touchable, but instead is outside of the unmasked region. Therefore, in this aspect, for smartphone use, the columnar region may be transformed in an estimation process using pre-computed values calculated to place crucial portions of the columnar region in the unmasked region. While many sets of values could be workable, one possible layout is the unmasked region 1100 shown in FIG. 23. This layout has two additional advantages not already identified. First, it matches the hand angle that many users naturally use with smartphones. Second, it leaves space in the background region area in the lower inner corner, which can be used for a key to be struck by the thumb, thereby adding one more finger to the set of fingers typing and so increasing typing speed. Note that for tablet use, the columnar transformations may not be constrained, allowing the user more flexibility.

Unmasked Columns For Dexterous Fingers

Another aspect of the present invention pertains to the choice of which finger columns or portions of finger columns to include in the unmasked columnar region. In this aspect, finger columns and portions of finger columns may be chosen that are associated with fingers that are more dexterous in preference to those associated with fingers that are less dexterous. In the unmasked columnar region 1000 shown in FIG. 21, only the finger columns associated with the index, middle, and ring fingers may be included in the unmasked region 1000, because these fingers are more dexterous than the finger columns associated with the pinky finger. Additionally, only a portion of the ring finger column may be included, because the ring finger is less dexterous than the middle and index fingers.

Mapping the Standard Layout to the Unmasked Region

Figure 23:
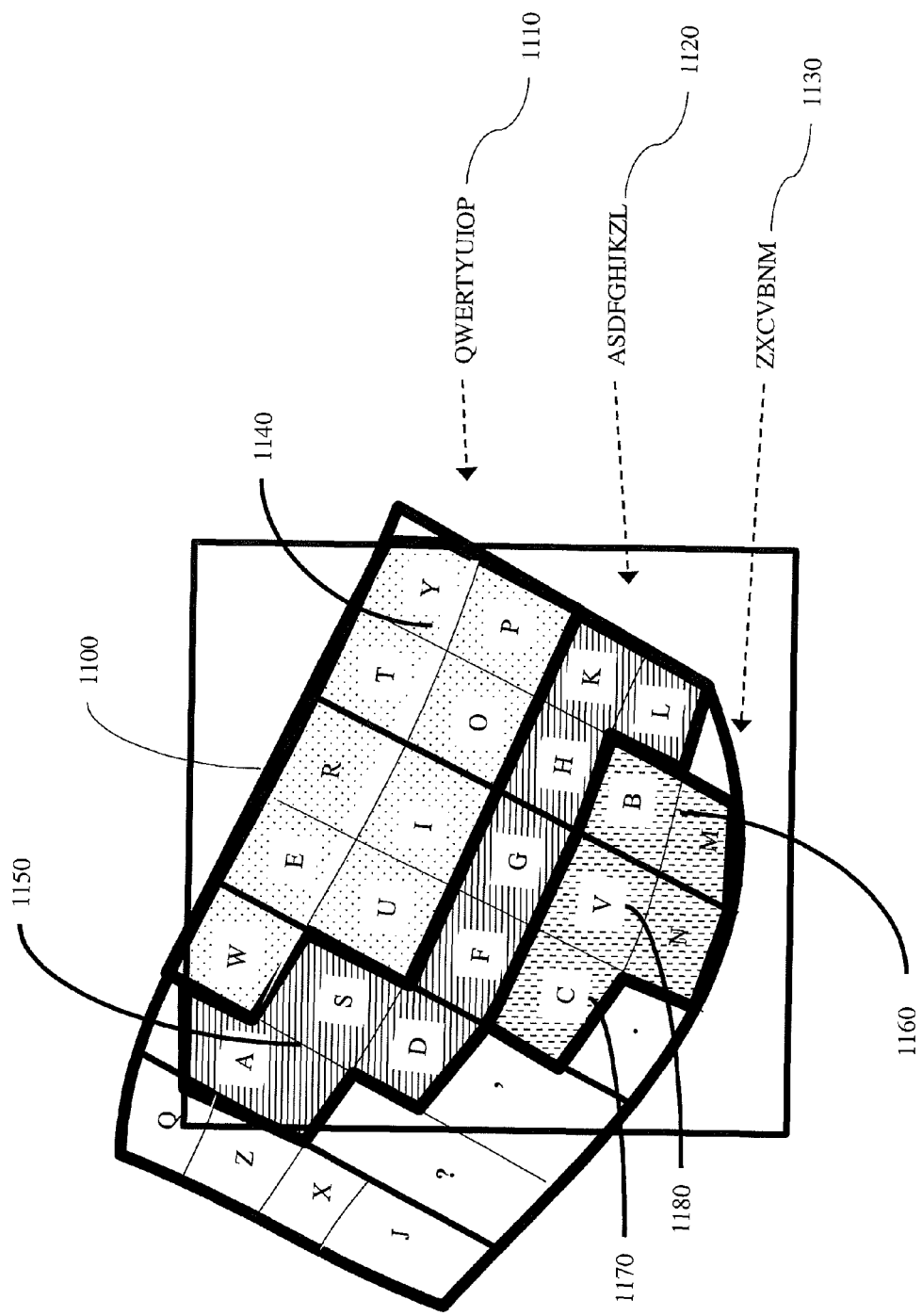
FIG. 23 shows transfer of a Standard Layout to unmasked regions in accordance with some aspects of the invention.

Another aspect of the present invention is shown in FIG. 23 and concerns the arrangement of the characters in the unmasked columnar region 1100. As explained in the background section, it may be advantageous for the characters in a layout such as the unmasked columnar region 1100 to retain positional similarity to characters in the Standard Layout. However, the three rows of alphabetic keys from a Standard Layout (1110, 1120, and 1130) are about 10 characters long, while the rows of unmasked columnar region 1100 are 5-6 characters long, so it may be difficult to remap, unbroken, whole rows of letter keys from the Standard Layout to the unmasked columnar region 1100. Therefore, the present aspect maps the three rows (1110, 1120, and 1130) from the Standard Layout to three regions (1140, 1150, and 1160, respectively) in the unmasked columnar region 1100. Each of the three regions 1140, 1150, and 1160 may occupy two or more rows of the unmasked columnar region. Some less frequent characters may be eliminated from the resulting mapping because of the small number of available keys.

This arrangement preserves as much of the positional similarity as possible of the Standard Layout. For example, the letter "c" 1170 is directly to the left of the letter "v" 1180, just as in the Standard Layout. As another example, the three bodies of keys 1140, 1150, and 1160 have roughly the same relative vertical placement as do the corresponding three Standard Layout rows 1110, 1120, and 1130. These positional similarities advantageously allow easier learning of the new layout and transfer of muscle memories.

Additional Embodiments

Another embodiment of the present invention may adapt the layout systems and methods described in the previous embodiments to create a two-handed virtual keyboard. This keyboard may be comprised of two one-handed virtual keyboard elements placed side by side: a left-handed element would be on the left, and a right-handed element would be on the right. Each of the two elements may contain the same core set of characters in their respective columnar regions, although these two regions might have different assignments of characters to keys. The characters found in the two background regions might be identical, or not, depending upon utility.

Another embodiment of the present invention may adapt the layout systems and methods described in the previous embodiments to a mechanical keyboard composed of electromechanical key switches. This embodiment may be sized using the estimation process to fit an average user's hand(s). The keyboard could either be one-handed, or could combine two one-handed elements into a two-handed keyboard. Many different kinds of key switches could be useful in this design. For example, a rocker switch that comprises two keys (such as keys E and R shown in FIG. 7). This switch may rock in a counterclockwise direction to type the left key, and in a clockwise direction to type the right key. This switch may allow only one of the two keys to be typed at once, eliminating an instance in which a user mistakenly strikes and types more than one key. Additionally, because a rocker switch rocks in different directions depending on which key is typed, a user may feel the direction of motion of the switch as they strike it and instantly know whether they have struck the intended key. The rocker switch may therefore boost typing accuracy.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a non-transitory computer readable storage medium having readable program code embodied in the storage medium, the computer program product includes at least one component operable to:

generate a virtual keyboard on a computing device comprising a plurality of keys configured in an adjustable layout, wherein the adjustable layout comprises the plurality of keys configured into a plurality of key columns; and the plurality of key columns are organized into one or more finger columns that comprise a predetermined number of keys configured to match certain fingers and finger widths;

wherein each finger column of the one or more finger columns match respectively, with a finger length and finger angle, computed directly from the position of each of a ring, middle, and index finger of a user's hand in a resting position on a computing device, and each finger column having a length that corresponds to the respective finger resting thereon and has a width that corresponds to a maximum width of the respective finger resting thereon.

2. The virtual keyboard of claim 1, wherein each finger area under the ring, middle, and index finger of a user's hand is defined based on a computed axis for each of the ring, middle, and index finger.

3. The virtual keyboard of claim 2, wherein an angle of each of the computed axis for each of the ring, middle, and index finger is computed based on an angle between a vector and a finger line segment associated with each of the ring, middle, and index finger.

4. The virtual keyboard of claim 2, wherein each key of the plurality of keys comprises at least one alphabet character, and infrequently used keys are configured smaller than frequently used keys.

5. The virtual keyboard of claim 4, wherein the adjustable layout comprises additional keys configured to be activated upon receiving a predefined gesture from the user's hand.

6. The virtual keyboard of claim 2, wherein each key of the plurality of keys comprises at least one frequently used character, and infrequently used characters are configured to be activated by gestures rather than being assigned to a key.

7. The virtual keyboard of claim 2, wherein each key of the plurality of keys comprises at least one character, and infrequently used keys are configured smaller than frequently used keys.

8. The virtual keyboard of claim 1, wherein each of the finger columns is arranged at a respective angle that is offset from perpendicular relative to a base of the computing device, and wherein each finger column is sloped in a direction determined based on an angle in which a respective finger of a user's hand extends from a palm area to a finger tip area in a resting position of the user's hand on the display.

9. A computer program product comprising a non-transitory computer readable storage medium having readable program code embodied in the storage medium, the computer program product includes at least one component operable to:

generate a virtual keyboard on a computing device comprising a plurality of keys configured in an adjustable layout, wherein the adjustable layout comprises the plurality of keys configured into a plurality of key columns; and the plurality of key columns are organized into one or more finger columns that comprise a predetermined number of keys configured to match certain fingers and finger widths;

wherein each finger column of the one or more finger columns match respectively with a finger length and finger angle, computed directly from the position of each of a ring, middle, and index finger of a user's hand in a resting position on a computing device, and each finger column having a length that corresponds to the respective finger resting thereon; wherein each key column of the plurality of key columns shares at least one column border with at least one other key column of the plurality of key columns, and the row borders meet along the at least one shared column border.

10. A system comprising:

a computing device comprising a touch sensitive input panel or display; and a virtual keyboard module implemented on hardware of the computing device, the virtual keyboard module configured to:

compute a finger area for the one or more fingers of a user's hand based on finger widths, calculated finger line segments, finger line angles, and a current handedness setting directly from each of a ring, middle, and index finger of a user's hand in a resting position on the computing device;

match the finger area for each of the one or more fingers to a finger column that comprises a predetermined number of virtual keys for the virtual keyboard; and generate the virtual keyboard on the touch sensitive input panel or the display such that each finger column is matched with the finger area calculated for each of the one or more fingers of the user's hand, each finger column having a length that corresponds to that of the respective finger in said resting position.

11. The system of claim 10, wherein each finger area under the ring, middle, and index finger of the user's hand is defined based on a computed axis for each of the ring, middle, and index finger.

12. The system of claim 11, wherein an angle of each of the computed axis for each of the ring, middle, and index finger is computed based on an angle between a vector and the finger line segment associated with each of the ring, middle, and index finger.

13. The system of claim 10, wherein each of the predetermined number of virtual keys for each finger column are configured to lie directly under each of the one or more fingers of the user's hand.

14. The system of claim 10, wherein each of the finger columns is arranged at a respective angle that is offset from perpendicular relative to a base of the computing device, and wherein each finger column is sloped in a direction determined based on an angle in which a respective finger of a user's hand extends from a palm area to a finger tip area in a resting position of the user's hand on the display.

* * * * *